(12) United States Patent
Seo et al.

(10) Patent No.: US 8,818,445 B2
(45) Date of Patent: Aug. 26, 2014

(54) POWER CONTROL METHOD FOR INTERFERENCE ALIGNMENT IN WIRELESS NETWORK

(75) Inventors: Han Byul Seo, Anyang-si (KR); Kaibin Huang, Seoul (KR); Soon Suk Roh, Seoul (KR); Sung Yoon Cho, Seoul (KR); Hyuk Jin Chae, Seoul (KR); Byoung Hoon Kim, Anyang-si (KR); Dong Ku Kim, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 205 days.

(21) Appl. No.: 13/576,385

(22) PCT Filed: Feb. 1, 2011

(86) PCT No.: PCT/KR2011/000752
§ 371 (c)(1),
(2), (4) Date: Jul. 31, 2012

(87) PCT Pub. No.: WO2011/096748
PCT Pub. Date: Aug. 11, 2011

(65) Prior Publication Data
US 2012/0302280 A1 Nov. 29, 2012

Related U.S. Application Data

(60) Provisional application No. 61/300,791, filed on Feb. 2, 2010, provisional application No. 61/364,395, filed on Jul. 15, 2010, provisional application No. 61/417,285, filed on Nov. 26, 2010.

(51) Int. Cl.
*H04B 7/00* (2006.01)

(52) U.S. Cl.
USPC ............ 455/522; 455/69; 455/501; 455/63.1; 455/114.2; 455/67.13; 455/296; 375/144; 375/148; 375/267; 375/285; 375/346; 370/335; 370/342

(58) Field of Classification Search
USPC ........... 455/522, 67.13, 63.1, 296, 501, 114.2
See application file for complete search history.

(56) References Cited

U.S. PATENT DOCUMENTS

| | | | | |
|---|---|---|---|---|
| 8,036,098 | B2 * | 10/2011 | Pereira et al. | 370/201 |
| 8,179,828 | B2 * | 5/2012 | Cai et al. | 370/311 |
| 8,462,873 | B2 * | 6/2013 | Park et al. | 375/285 |
| 8,514,774 | B2 * | 8/2013 | Ge et al. | 370/328 |

(Continued)

FOREIGN PATENT DOCUMENTS

| | | |
|---|---|---|
| KR | 10-2006-0059984 | 6/2006 |
| WO | 2004/084431 | 9/2004 |

*Primary Examiner* — Marceau Milord
(74) *Attorney, Agent, or Firm* — Lee, Hong, Degerman, Kang & Waimey

(57) ABSTRACT

A power control method for interference alignment in wireless network having K transmitters and K receivers is provided. The method includes: receiving, performed by receiver n (n is an integer, $1 \leq n \leq K-1$), a power indication signal of transmitter n+1 from the transmitter n+1; determining, performed by the receiver n, power of transmitter n; and transmitting, performed by the receiver n, a power indication signal of transmitter n to the transmitter n, wherein the power of transmitter n is determined based on a residual interference of the receiver n, and the power indication signal of transmitter n indicates a minimum transmission power or a maximum transmission power of transmitter n.

10 Claims, 9 Drawing Sheets

(56) References Cited

U.S. PATENT DOCUMENTS

| | | | |
|---|---|---|---|
| 2007/0165738 A1* | 7/2007 | Barriac et al. | 375/267 |
| 2009/0323600 A1 | 12/2009 | Chandra et al. | |
| 2013/0078991 A1* | 3/2013 | Nam | 455/423 |
| 2013/0157705 A1* | 6/2013 | Kwon et al. | 455/501 |

* cited by examiner (a)

(b)

POWER CONTROL METHOD FOR INTERFERENCE ALIGNMENT IN WIRELESS NETWORK

CROSS-REFERENCE TO RELATED APPLICATIONS

This application is the National Stage filing under 35 U.S.C. 371 of International Application No. PCT/KR2011/000752 filed on Feb. 1, 2011, which claims the benefit of U.S. Provisional Application Ser. No. 61/300,791, filed on Feb. 2, 2010, U.S. Provisional Application Ser. No. 61/364,395, filed on Jul. 15, 2010, and U.S. Provisional Application Ser. No. 61/417,285, filed on Nov. 26, 2010, the contents of which are all incorporated by reference herein in their entirety.

TECHNICAL FIELD

The present invention relates to wireless communication, and more particularly, to a power control method for interference alignment in wireless network.

BACKGROUND ART

In a wireless network with multiple interfering links, interference alignment (IA) is used. IA is a transmission scheme achieving linear sum capacity scaling with the number of data links, at high SNR. With IA, each transmitter designs the precoder to align the interference on the subspace of allowable interference dimension over the time, frequency or space dimension, where the dimension of interference at each receiver is smaller than the total number of interferers. Therefore, each receiver simply cancels interferers and acquires interference-free desired signal space using zero-forcing (ZF) receive filter.

In practical interference alignment (IA) systems, beamformers (precoding vectors) are computed based on limited feedback of channel state information (CSI). Suppressing residual interference caused by CSI inaccuracy can lead to overwhelming network feedback overhead. An alternative solution for coping with residual interference is to control the transmission power of all transmitters such that the network throughput is maximized. Finding the optimal power control method for multi-antenna IA system requires solving a non-convex optimization problem and has no known closed-form solution.

SUMMARY OF INVENTION

Technical Problem

It is an object of the present invention to provide a power control method of interference alignment in wireless network nearly optimal.

Solution to Problem

A power control method for interference alignment in wireless network having K transmitters and K receivers, the method comprising: receiving, performed by receiver n (n is an integer, $1 \leq n \leq K-1$), a power indication signal of transmitter n+1 from the transmitter n+1; determining, performed by the receiver n, power of transmitter n; and transmitting, performed by the receiver n, a power indication signal of transmitter n to the transmitter n, wherein the power of transmitter n is determined based on a residual interference of the receiver n, and the power indication signal of transmitter n indicates a minimum transmission power or a maximum transmission power of transmitter n.

Advantageous Effects of Invention

In accordance with the present invention, sum rate capacity of a wireless network approaches near optimal result.

MODE FOR THE INVENTION

In a wireless network with multiple interfering links, interference alignment (IA) uses precoding to align at each receiver the interference components from different sources. As a result, in the high SNR regime, the network capacity scales logarithmically with the signal-to-noise-ratio (SNR) and linearly with half of the number of parallel subchannels, called degrees of freedom (DOF). In addition, in the presence of multi-antennas, the capacity also scales linearly with the spatial DOF per link. IA has been proved to be optimal in terms of DOF.

This motivates extensive research on IA methods for various types of channels and settings, including MIMO channel, cellular networks, distributed IA, IA in the signal space and limited feedback. However, most existing works on IA rely on the impractical assumption that each transmitter in an IA network requires perfect CSI of all interference channels. Some preliminary results have been obtained on the scaling laws of numbers of CSI feedback bits with respect to the SNR under the IA constraint. However, there exist no designs of practical CSI feedback algorithms for IA networks.

To facilitate the description of present invention, the framework of the present invention will be explained firstly.

Figure 1:
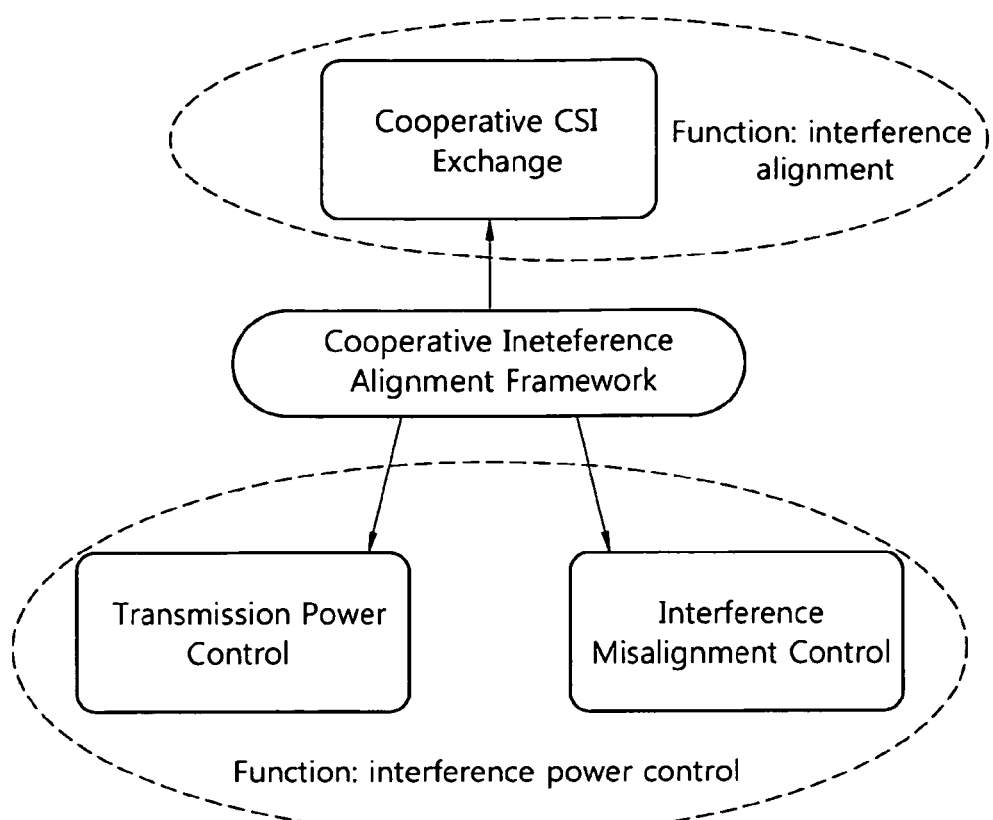
FIG. 1 shows a framework of the present invention.

FIG. 1 shows a framework of the present invention.

Referring FIG. 1, the framework of the present invention comprises a cooperative CSI exchange, a transmission power control and a interference misalignment control.

1. Cooperative CSI exchange: Transmit beamformers will be aligned progressively by iterative cooperative CSI exchange between interferers and their interfered receivers. In each round of exchange, a subset of transmitters receive CSI from a subset of receivers and relay the CSI to a different subset of receivers. Based on this approach, CSI exchange methods are optimized for minimizing the number of CSI transmission links and the dimensionality of exchanged CSI, resulting in small network overhead.

2. Transmission power control: Given finite-rate CSI exchange, quantization errors in CSI cause interference misalignment. To control the resultant residual interference, methods are invented to support exchange of transmission power control (TPC) signals between interferers and receivers to regulate the transmission power of interferers under different users' quality-of-service (QoS) requirements. Since IA is decentralized and links are coupled, multiple rounds of TPC exchange may be required.

3. Interference misalignment control: Besides interferers' transmission power, another factor that influences interference power is the degrees of interference misalignment (IM) of transmit beamformers, which increase with CSI quantization errors and vice versa. The IM degrees are regulated by adapting the resolutions of feedback CSI to satisfy users' QoS requirements. This requires the employment of hierarchical codebooks at receivers that support variable quantization resolutions. Designing IM control policies is formulated as an optimization problem of minimizing network feedback overhead under the link QoS constraints. Furthermore, the policies are optimized using stochastic optimization to compress feedback in time.

In addition, it will be described a star feedback method, a efficient interference alignment for 3-cell MIMO interference channel with limited feedback and binary power control for IA with limited feedback.

4. Star Feedback Method: For achieving IA, each precoder is aligned to other precoders and thus its computation can be centralized at central unit, which is called CSI base station (CSI-BS). In star feedback method, CSI-BS gathers CSI of interference from all receivers and computes the precoders. Then, each receiver only feeds CSI back to CSI-BS, not to all transmitters. For this reason, star feedback method can effectively scale down CSI overhead compared with conventional feedback method.

5. Efficient interference alignment for 3 cell MIMO interference channel with limited feedback Conventional IA solution for achieving the optimal DOF and a special case IA solution requires product of all cross link channel information since all precoders are coupled. When limited feedback channel is assumed, channel matrix product arises a critical problem that there is a K-fold increase in error of initial precoder due to multiplied and summed channel quantization errors. IA solution for achieving the optimal DOF may not be optimal in practical number of feedback bits.

To avoid the product of channel matrices and get better performance, a DOF following method is proposed. If one node does not use a DOF, IA solution is separated to several independent equation, resulting in avoiding the product of all cross link channel matrices and reducing feedback overhead.

6. Binary Power Control for Interference Alignment with Limited Feedback: In practical interference alignment (IA) systems, beamformers (i.e. precoding vector or matrix) are computed based on limited feedback of channel state information (CSI). Suppressing residual interference caused by CSI inaccuracy can lead to overwhelming network feedback overhead. An alternative solution for coping with residual interference is to control the transmission power of all transmitters such that the network throughput is maximized. Finding the optimal power control policy for multi-antenna IA system requires solving a non-convex optimization problem and has no known closed-form solution. To overcome this difficulty, it is proposed the simple binary power control (BPC) method, which turns each the transmission either off or on with the maximum power. Furthermore, we design a distributive algorithm for realizing BPC. Simulation shows that BPC achieves sum throughput closed to the centralize optimal solution based on an exhaustive search.

Firstly, a system model is described.

I. System Model.

we introduce the system model of K user MIMO interference channel and define the metric of network overhead that is required for implementing IA precoder.

Consider K user interference channel, where K transmitter-receiver links exist on the same spectrum and each transmitter send an independent data stream to its corresponding receiver while it interferers with other receivers. Assuming every transmitter-receiver node is equipped with M antennas, the channel between transmitter and receiver is modeled as M×M independent MIMO block channel consisting of path-loss and small-scale fading components. Specifically, it is denoted the channel from the j-th transmitter and the k-th receiver as $d_{kj}^{-\alpha/2} H^{[kj]}$, where $\alpha$ is the path-loss exponent, $d_{kj}$ is the distance between transmitter and receiver and $H^{[kj]}$ is M×M matrix of independently and identically distributed circularly symmetric complex Gaussian random variables with zero mean and unit variance, denoted as CN(0,1).

Let denote $v^{[k]}$ and $r^{[k]}$ as a (M×1) beamforming vector and receive filter at the k-th transceiver, where $\|v^{[k]}\|^2 = \|r^{[k]}\|^2 = 1$. A beamforming vector can be called other terminologies such as beamformer or a precoding vector. Then, the received signal at the k-th receiver can be expressed as below equation.

$$y^{[k]} = H^{[kk]} v^{[k]} s_k + \sum_{j \neq k} H^{[kj]} v^{[j]} s_j + n_k. \qquad [\text{equation 1}]$$

and the sum rate is calculated as below equation.

$$R_{sum} = \sum_{k=1}^{K} \log_2 \left( 1 + \frac{\frac{P}{d_{kk}^{\alpha}} |r^{[k]\dagger} H^{[kk]} v^{[k]}|^2}{\sum_{k \neq j} \frac{P}{d_{kj}^{\alpha}} |r^{[k]\dagger} H^{[kj]} v^{[j]}|^2 + \sigma^2} \right) \qquad [\text{equation 2}]$$

where $s_k$ denotes a data symbol sent by the k-th transmitter with $E[|s_k|^2] = P$ and $n_k$ is additive white Gaussian noise (AWGN) vector with covariance matrix $\sigma^2 I_M$.

Under the assumption of perfect and global CSI, IA aims to align interference on the lower dimensional subspace of the received signal space so that each receiver simply cancels interferers and acquires K interference-free signal space using zero-forcing (ZF) receive filter satisfying following equation.

$$r^{[k]\dagger} H^{[kj]} v^{[j]} = 0, \forall k \neq j \qquad [\text{equation 3}]$$

Therefore, the achievable sum rate of IA is computed by below equation.

$$R_{sum} = \sum_{k=1}^{K} \log_2 \left( 1 + \frac{P}{\sigma^2} d_{kk}^{-\alpha} |r^{[k]\dagger} H^{[kk]} v^{[k]}|^2 \right) \qquad [\text{equation 4}]$$

It is assumed that each receiver, say the m-th receiver, perfectly estimates all interference channels, namely the set of matrices $\{H^{[mk]}\}_{k=1}^{K}$. Also, it is considered the case where CSI can be sent in both directions between a transmitter and a receiver.

II. CSI Feedback Methods.

In MIMO constant channel, the closed form solution of IA in K=3 user is presented in prior arts. And the solution of K=M+1 with a single data stream at transmitter-receiver pairs is proposed in prior arts. However, such closed form solutions in general K user interference channel are still open problem. Here, three CSI feedback methods, namely the 1. CSI exchange method (method 1), 2. modified CSI exchange method (method 2) and 3. star feedback method (method 3) are described for achieving IA under the constraints K=M+1. Also, we compare the efficiency of each feedback method with sum overhead defined as the total number of complex CSI coefficients transmitted in the network for a given channel realization expressed in equation 5.

$$N = \sum_{m,k \in \{1,2,\ldots,K\}} \left(N_{TR}^{[mk]} + N_{RT}^{[mk]}\right) \quad \text{[equation 5]}$$

In equation 5, $N_{TR}^{[mk]}$ denotes the integer equal to the number of complex CSI coefficients sent from the k-th receiver to the m-th transmitter, and $N_{RT}^{[mk]}$ from the k-th transmitter to the m-th receiver.

Figure 2:
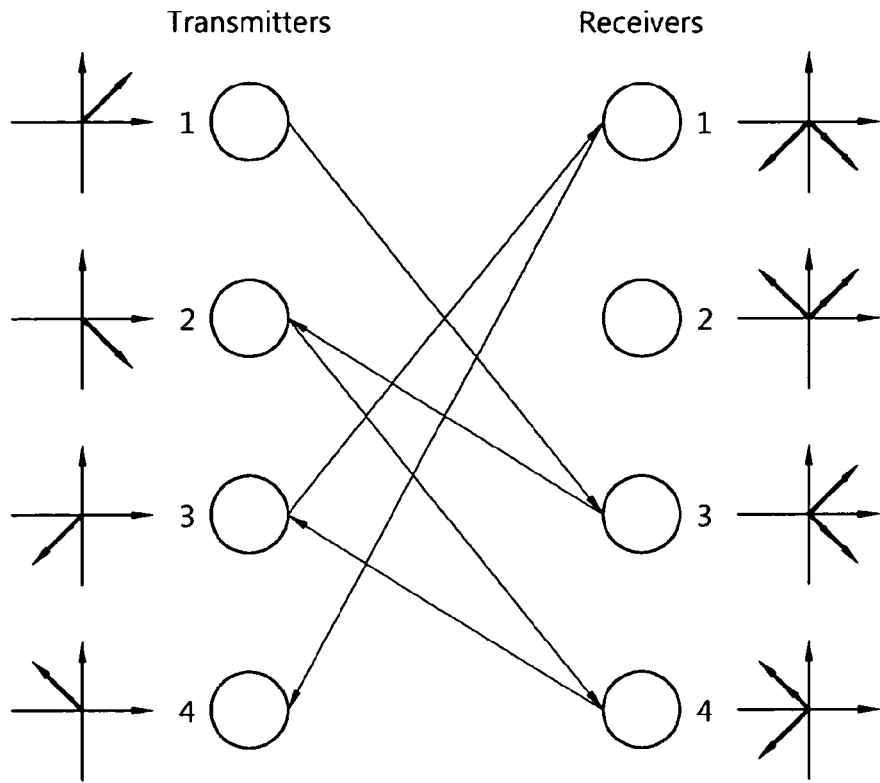
FIG. 2 shows a CSI exchange method (method 1).

FIG. 2 shows a CSI exchange method in the case of K=4 (method 1).

Assuming each pair of transmitter-receiver gets one multiplexing gain under the constraint K=M+1, the set of interference $\{H^{[mk]}v^{[k]}\}_{k=1;k\neq m}^{K}$ at each receiver should be aligned on the subspace of dimension at most M−1 to satisfy IA condition which described in equation 3. That is to say, at least two of all interferers are designed on the same subspace at the receiver as below equation.

$$\begin{aligned}
\text{span } (H^{[1K-1]}v^{[K-1]}) &= \text{span } (H^{[1K]}v^{[K]}) & \text{at receiver 1} \\
\text{span } (H^{[2K]}v^{[K]}) &= \text{span } (H^{[21]}v^{[1]}) & \text{at receiver 2} \\
\text{span } (H^{[31]}v^{[1]}) &= \text{span } (H^{[32]}v^{[2]}) & \text{at receiver 3} \\
&\vdots \\
\text{span } (H^{[KK-2]}v^{[K-2]}) &= \text{span } (H^{[KK-1]}v^{[K-1]}) & \text{at receiver } K
\end{aligned} \quad \text{[equation 6]}$$

In equation 6, span(A) denotes the vector space that spanned by the columns of A and each equation satisfies that span $(H^{[k+2k]}v^{[k]})$=span $(H^{[k+2k+1]}v^{[k+1]})$ (i.e. span$(v^{[k]})$=span $(H^{[k+2k]})^{-1}H^{[k+2k+1]}v^{[k+1]}))$. As concatenating {span $(v^{[k]})\}_{k=1}^{K}$, IA beamformers are computed by below equation and then normalized to have unit norm.

$$\begin{aligned}
v^{[1]} &= \text{any eigenvector of } (H^{[21]})^{-1}H^{[2K]}(H^{[1K]})^{-1}H^{[1K-1]} \\
&\qquad \ldots (H^{[32]})^{-1}H^{[31]} \\
v^{[2]} &= (H^{[32]})^{-1}H^{[31]}v^{[1]} \\
&\vdots \\
v^{[K-1]} &= (H^{[KK-1]})^{-1}H^{[KK-2]}v^{[K-2]} \\
v^{[K]} &= (H^{[1K]})^{-1}H^{[1K-1]}v^{[K-1]}
\end{aligned} \quad \text{[equation 7]}$$

The solution of k-th beamformer $v^{[k]}$ in equation 7 is serially determined by the product of pre-determined $v^{[k-1]}$ and channel matrix $(H^{[k+1k-1]})^{-1}H^{[k+1k-1]}$.

Hereinafter, using the property that $v^{[k]}$ is serially determined, CSI exchange method (method 1) will be described. Hereinafter, it is assumed that K=4, M=3.

1. First, transmitters determine which interferers are aligned on the same subspace at each receiver. Then, each transmitter informs its corresponding receiver of the indices of two interferers to be aligned in the same direction. This process is called set-up.

2. Receiver k(∀k≠3) feeds back the product matrix $(H^{[21]})^{-1}H^{[2K]}, \ldots, (H^{[32]})^{-1}H^{[31]}$ to receiver 3 which determines $v^{[1]}$ as any eigenvector of $(H^{[21]})^{-1}H^{[2K]}(H^{[1K]})^{-1}$ $H^{[1K-1]} \ldots (H^{[32]})^{-1}H^{[31]}$. Then, $v^{[1]}$ is fed back to transmitter 1.

3. Computation of $v^{[2]}, \ldots, v^{[K-1]}$: Transmitter k−1 feeds forward $v^{[k-1]}$ to receiver k+1. Then, receiver k+1 calculates $v^{[k]}$ using equation 7 and feeds back $v^{[k]}$ to transmitter k. This process is performed for k=2 to K−1.

4. computation of $v^{[K]}$.

Transmitter K−1 feeds forward $v^{[K-1]}$ to receiver 1. Then, receiver 1 calculates $v^{[K]}$ using equation 7 and feeds back $v^{[K]}$ to transmitter K.

In CSI exchange method, two interferers are aligned at each receiver among K−1 interferers. Therefore, the receiver requires the indices of two interferers to be aligned before starting the computation and exchange procedure of $\{v^{[1]}, \ldots, v^{[K]}\}$. The signals for a set-up are forwarded through a control channel from transmitter to corresponding receiver. These set-up signals are forwarded through $B_{setup}$ bits control channel from transmitter to corresponding receiver and its overhead is computed in following lemma.

Lemma 1. The set-up overhead for the CSI exchange method is given as below equation.

$$B_{setup} = \left\lceil K \cdot \log_2\left(\frac{(K-1)(K-2)}{2}\right)\right\rceil \quad \text{[equation 8]}$$

Each receiver has K−1 interferers from other transmitters. Therefore, $_{K-1}C_2$ groups of aligned interferers exist at each receiver, where $_{K-1}C_2$=(K−1)(K−2)/2. To inform each of K receivers about the group of aligned interferers, total $$\left\lceil K \cdot \log_2\left(\frac{(K-1)(K-2)}{2}\right)\right\rceil$$

bits are required for the set-up signaling.

Once the aligned interferers are indicated at the receiver, each receiver feeds back CSI of the selected interferers in given channel realization and the beamformers $v^{[1]}$, $v^{[2]}, \ldots, V^{[K]}$ are sequentially determined by method 1. The overhead for the CSI exchange method can be measured in terms of the number of exchanged complex channel coefficients. Such overhead is specified in the following proposition.

Proposition 1.

For the CSI exchange method in MIMO channel, the network overhead is given as below equation.

$$N_{EX}=(K-1)M^2+(2K-1)M \quad \text{[equation 9]}$$

All receivers inform CSI of the product channel matrices to receiver 3, which comprises $(K-1)M^2$ nonzero coefficients. After computing the beamformer $v^{[1]}$, M nonzero coefficients are required to feed it back to transmitter 1. Each beamformer is determined by iterative precoder exchange between transmitters and interfered receivers. In each round of exchange, the number of nonzero coefficients of feedforward and feedback becomes 2M. Thus, total network overhead comprises $(K-1)M^2+(2K-1)M$.

Figure 3:
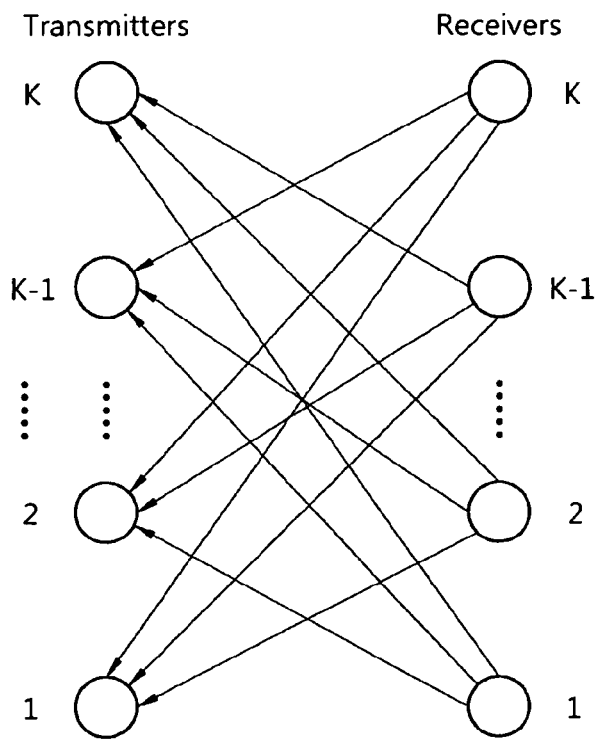
FIG. 3 illustrates a conventional full-feedback method.

FIG. 3 illustrates a conventional full-feedback method.

For comparison, the sum overhead for the convention CSI feedback method is illustrated. In the existing IA literature, the design of feedback method is not explicitly addressed. Existing works commonly assume CSI feedback from each receiver to all its interferers, corresponding to the full-feedback method illustrated in FIG. 3. For such a conventional method, each receiver transmits the CSI $\{H^{[mk]}\}_{k=1}^{K}$ to each of its K−1 transmitters and the resultant sum overhead is given in the following lemma.

Lemma 2. The sum overhead of the full-feedback method is given as below equation.

$$N_{FF} = K^2(K-1)M^2 \qquad \text{[equation 10]}$$

Each receiver feeds back K×M² nonzero coefficients to K−1 interferers. Since K receivers feed back CSI, total network overhead comprises $K^2(K-1)M^2$.

From the above result, the overhead $N_{FF}$ increases approximately as $K^3M^2$ whereas the network throughput grows linearly with K. Thus the network overhead is potentially a limiting factor of the network throughput. By comparing proposition 1 and lemma 2, with respect to the full-feedback method, the CSI exchange method requires much less sum overhead for achieving IA, namely on the order of $KM^2$.

In the CSI exchange method described above, $v^{[1]}$ is solved by the eigenvalue problem that incorporates the channel matrices of all interfering links. However, it still requires a huge overhead in networks with many links or antennas. To suppress CSI overhead of $v^{[1]}$, we may apply the follow additional constraints indicated by a below equation.

$$\text{span}(H^{[i1]}v^{[1]}) = \text{span}(H^{[i2]}v^{[2]})$$

$$\text{span}(H^{[i+11]}v^{[1]}) = \text{span}(H^{[i+12]}v^{[2]}) \qquad \text{[equation 11]}$$

In equation 11, i is not 1 or 2. As $v^{[1]}$ and $v^{[2]}$ are aligned on same dimension at receiver i and i+1, $v^{[1]}$ is computed as the eigenvalue problem of $(H^{[i1]})^{-1}H^{[i2]}(H^{[i+12]})^{-1}H^{[i+11]}$ that consists of two interfering product matrices.

Applying the properties expressed in equation 11 at receiver K−1 and K, it can be reformulated IA condition under K=M+1 constraints as below equation.

[equation 12]

$$\begin{aligned}
\text{span}(H^{[12]}v^{[2]}) &= \text{span}(H^{[13]}v^{[3]}) && \text{at receiver 1} \\
\text{span}(H^{[23]}v^{[3]}) &= \text{span}(H^{[24]}v^{[4]}) && \text{at receiver 2} \\
&\vdots \\
\text{span}(H^{[K-11]}v^{[1]}) &= \text{span}(H^{[K-12]}v^{[2]}) && \text{at receiver } K-1 \\
\text{span}(H^{[K1]}v^{[1]}) &= \text{span}(H^{[K2]}v^{[2]}) && \text{at receiver } K
\end{aligned}$$

It follows that $v^{[1]}, v^{[2]}, \ldots, v^{[K]}$ can be selected as below equation.

[equation 13]

$$\begin{aligned}
v^{[1]} &= \text{eigenvector of } (H^{[K-11]})^{-1}H^{[K-12]}(H^{[K2]})^{-1}H^{[K1]} \\
v^{[2]} &= (H^{[K2]})^{-1}H^{[K1]}v^{[1]} \\
v^{[3]} &= (H^{[13]})^{-1}H^{[12]}v^{[2]} \\
&\vdots \\
v^{[K]} &= (H^{[K-2K]})^{-1}H^{[K-2K-1]}v^{[K-1]}
\end{aligned}$$

Using the equation 13, the CSI exchange method can be modified. The modified CSI exchange method can be called a method 2 for a convenience. The method 2 comprises following procedures.

1. First, transmitters determine which interferers are aligned on the same subspace at each receiver. Then, each transmitter informs its corresponding receiver of the indices of two interferers to be aligned in the same direction (set-up).

2. Receiver K forwards the matrix $(H^{[K2]})^{-1}H^{[K1]}$ to receiver K−1. Then, receiver K−1 computes $v^{[1]}$ as any eigenvector of $(H^{[K-11]})^{-1}H^{[K-12]}(H^{[K2]})^{-1}H^{[K1]}$ and feeds back it to the transmitter 1.

3. Transmitter 1 feeds forward $v^{[1]}$ to receiver K. Then, receiver K calculates $v^{[2]}$ and feeds back $v^{[2]}$ to transmitter 2.

4. Computation of $v^{[3]}, \ldots, v^{[K]}$

Transmitter k−1 feeds forward $v^{[k-1]}$ to receiver k−2. Then, receiver k−2 calculates $v^{[k]}$ and feeds back $v^{[1]}$ to transmitter k−1. This process is performed for k=3 to K.

The corresponding sum overhead of modified CSI exchange method (method 2) is given in the following equation.

$$N_{MEX} = M^2+(2K-1)M \qquad \text{[equation 14]}$$

Comparing the method 2 with the method 1, both methods show the same burden of overhead for the exchange of beamformers. However, the product channel matrix for v I'J in Modified CSI exchange method requires constant $M^2$ overhead in any K user case while overhead of $v^{[1]}$ in CSI exchange method increases with $KM^2$.

The CSI exchange methods (method 1, method 2) in previous description degrade the amount of network overhead compared with conventional full feedback method. However, it requires 2K−1 iterations for the exchange of beamformers in method 1 and 2. As the number of iterations is increased, a full DoF in K user channel can not be achievable since it causes time delay that results in significant interference misalignment for fast fading. To compensate for these drawbacks, we suggest the star feedback method illustrated in FIG. 4.

Figure 4:
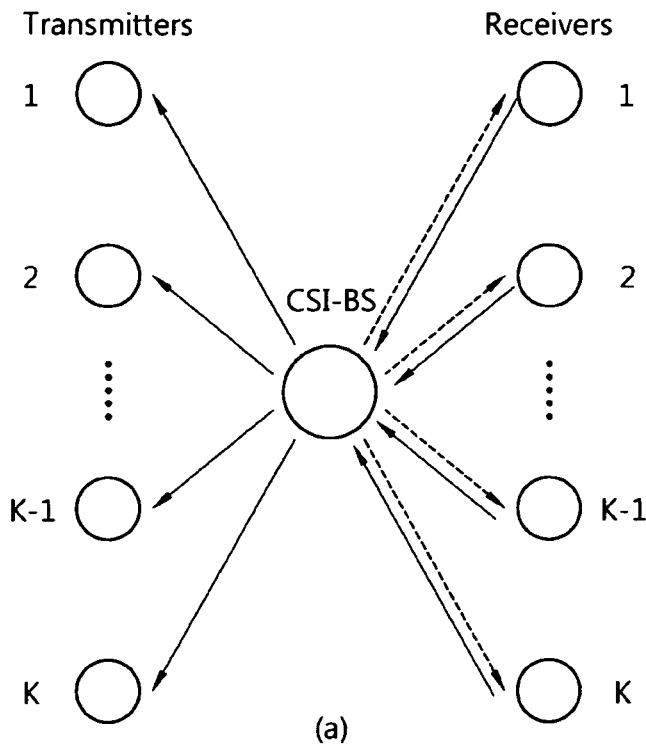
FIG. 4 shows an example of star feedback method (method 3).
Figure 4:
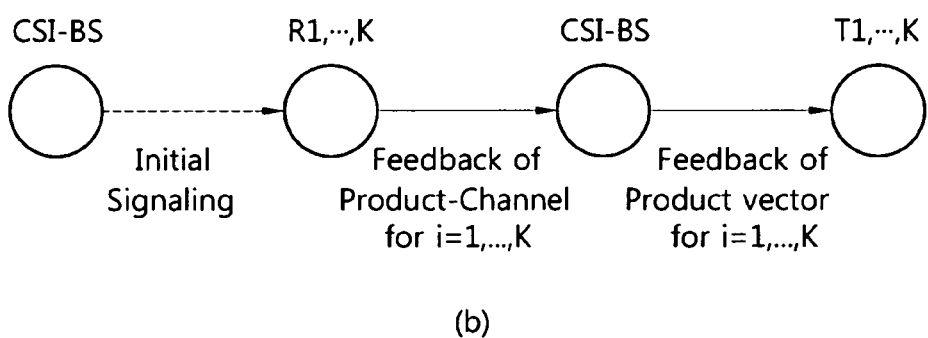

FIG. 4 shows an example of star feedback method (method 3).

Referring FIG. 4, wireless network comprises a CSI-base station, a plurality of transmitters, a plurality of receivers. The wireless network using the star feedback method comprises an agent, called the CSI base station (CSI-BS) which collects CSI from all receivers, computes all beamformers using IA condition in equation 7 or equation 13 and sends them back to corresponding transmitters. This method 3 is feasible since the computation of beamformers for IA is linked with each other and same interference matrices are commonly required for those beamformers. In large K, the star method allows much smaller delay compared with CSI exchange methods (method 1, method 2).

Star feedback method for IA in wireless network will be described.

1. Initialization: CSI-BS determines which interferers are aligned on the same dimension at each receiver. Then, it informs each receiver of the required channel information for computing IA.

2. Computation of $v^{[1]}, \ldots, v^{[K]}$: The CSI-BS collects CSI from all receivers that comprises $K \times M^2$ nonzero coefficients and computes beamformers $v^{[1]}, \ldots, v^{[K]}$ with the collected set of CSI.

3. Broadcasting $v^{[1]}, \ldots, v^{[K]}$: CSI-BS forwards $v^{[k]}$ to transmitter k for k=1, ..., K, which requires M nonzero coefficient to each of K transmitters.

For the star feedback method in MIMO channel, the network overhead is given as below equation.

$$N_{SF} = (M^2 + M)K \quad \text{[equation 15]}$$

Star feedback method requires only two time slots for computation of IA beamformers in any number of user K. Therefore, it is robust against channel variations due to the fast fading while CSI exchange methods are affected by 2K−1 slot delay for implementation. However, the network overhead of star feedback method is increased with $KM^2$ which is larger than 2KM in modified CSI exchange method. Also, star feedback method requires CSI-BS that connects all pairs of transmitter-receiver should be implemented as the additional costs.

The Network overhead of star feedback method can be quantified as below.

i) The overhead for initialization: Each receiver has K−1 interferers from other transmitters. Therefore, $_{k-1}C_2$ groups of aligned interferers exist at each receiver, where $_{k-1}C_2$=(K−1)(K−2)/2. To inform each receiver about the group of aligned interferers, total K $\log_2$((K−1)(K−2)/2) bits are required for initial signaling.

ii) Feedback overhead for star feedback method: The CSI-BS collects CSI of product channels from all receivers that comprises $KM^2$ nonzero coefficients. After computing the precoding vectors, CSI-BS transmits a precoder of M nonzero coefficient to each of K transmitters. Therefore, ($KM^2 + 2M$) nonzero coefficients are required for feedback in star feedback method.

The above result shows that the network overhead for the star feedback method is a linear function of K in contrast with the cubic function for conventional feedback method in MIMO channel. Thus the former method leads to a much slower increase of network overhead with K.

III. Effect of CSI Feedback Quantization

In the precoding description, the CSI feedback methods are designed on the assumption of perfect CSI exchange. However, CSI feedback from receiver to transmitter requires the channel quantization under the finite-rate feedback constraints in practical implementation. This quantized CSI causes the degradation of system performance due to the residual interference at each receiver. In this section, we characterize the throughput loss as the performance degradation in limited feedback. Furthermore, we derive an upper-bound of sum residual interference as the throughput loss and analyze it as a function of the number of feedback bits in given channel realization.

A. Throughput Loss in Limited Feedback

For the analytical simplicity, let define the throughput loss, $\Delta R_{sum}$ as below equation.

$$\Delta R_{sum} := E_H\left[\sum_{k=1}^{K} \log_2\left(\frac{Pd_{kk}^{-\alpha}|r^{[k]1}H^{[kk]}v^{[k]}|^2}{\sigma^2}\right) - \sum_{k=1}^{K} \log_2\left(\frac{Pd_{kk}^{-\alpha}|r^{[k]1}H^{[kk]}v^{[k]}|^2}{\hat{I}^{[k]} + \sigma^2}\right)\right] \quad \text{[equation 16]}$$

$$= E_H\left[\sum_{k=1}^{K} \log_2(\hat{I}^{[k]})\right]$$

$$\overset{(a)}{\leq} E_H\left[K\log_2\left(\frac{1}{K}\sum_{k=1}^{K}\hat{I}^{[k]}\right)\right]$$

In equation 16, $\hat{v}^{[k]}$ and $\hat{r}^{[k]}$ are the transmit beamformer and receive filter based on the quantized CSI and '(a)' follows from the characteristic of concave function log(x), denoting $$\hat{I}^{[k]} = \sum_{j=1, j\neq k}^{K} \frac{R}{d_{kj}^{\alpha}}|\hat{r}^{[k]1}H^{[kj]}\hat{v}^{[j]}|^2$$

Applying Jensen's inequality, the throughout loss is upper-bounded by below equation.

$$\Delta R_{sum} \leq K\log_2\left(\frac{1}{K}E_H\left[\sum_{k=1}^{K}\hat{I}^{[k]}\right]\right) \quad \text{[equation 17]}$$

In equation 17, $\Delta R_{sum}$ is significantly affected by the sum residual interference $$\hat{I}^{sum} = \sum_{k=1}^{K} \hat{I}^{[k]}.$$

Therefore, the minimization of sum rate loss is equivalent to the minimization of sum residual interference caused by limited feedback bit constraints.

B. Residual Interference in the Proposed CSI Feedback Methods

Prior to deriving the bound of sum residual interference in proposed CSI feedback methods, we quantify the quantization error with RVQ using the distortion measure. Let denote h:=vec(H)/∥H∥, $\hat{h} :=$ vec($\hat{H}$)/∥$\hat{H}$∥$_F$ and the phase rotation, $$e^{j\phi} := \hat{h}^{\dagger}h/|\hat{h}^{\dagger}h|,$$

where $$H, \hat{H} \in \mathbb{C}^{N \times M}.$$

Then, h can be expressed by below equation.

$$h = e^{j\phi}\hat{h} + \Delta h \quad \text{[equation 18]}$$

In equation 18, $$\Delta h$$

represents the difference between h and $$e^{j\phi}\hat{h}.$$

H is follows below equation.

$$\Delta H$$

is defined such that $$\text{vec}(\Delta H) = \Delta h.$$

$$H = e^{j\phi}\hat{H} + \Delta H \quad \text{[equation 19]}$$

Lemma 3. The expected squared norm of the random matrix $$\Delta h$$

is bounded as below equation.

$$E[\|\Delta H\|_F^2] \leq 2\Gamma(MN) \cdot 2^{-\frac{B}{MN-1}} \quad \text{[equation 20]}$$

In equation 20, B denotes quantization bit for H and $$\Gamma(MN) = \frac{2\Gamma\left(\frac{1}{MN-1}\right)}{MN-1}$$

Using properties of lemma 3, we rewrite equation 18 and equation 19 as below equation.

$$h = e^{j\phi}\hat{h} + \sigma_{\Delta h}\Delta\tilde{h}$$

$$H = e^{j\phi}\hat{H} + \sigma_{\Delta h}\Delta\tilde{H}, \quad \text{[equation 21]}$$

In equation 21, $$\Delta h = \sigma_{\Delta h}\Delta\tilde{h}, \ E\left[\|\Delta\tilde{h}\|^2\right] = 1, \ E\left[\|\Delta\tilde{H}\|_F^2\right] = 1 \text{ and}$$

$$\sigma_{\Delta h}^2 \leq \Gamma(MN) \cdot 2^{-\frac{B}{MN-1}}.$$

Also, we derive the error bound of eigenvector of the quantized matrix, which is applied to analyze the sensitivity towards quantization error on the initialization of $v^{[1]}$. Based on the modeling of quantization error of H in equation 22, we derive the eigenvector of $$\hat{H}$$

using the perturbation theory in following lemma.
Lemma 4. For a large B, the m-th eigenvector $$\hat{v}_m$$

of $$\hat{H}$$

is given as below equation.

$$\hat{v}_m = e^{-j\varphi}\left(v_m - \sigma_{\Delta h}\sum_{k=1, k \neq m}^{M}\frac{v_k^*\Delta\tilde{H}v_m}{\lambda_m - \lambda_k}v_k\right) \quad \text{[equation 22]}$$

In equation 22, $v_m$ and $\lambda_m$ are the m-th eigenvector and eigenvalue of H.

1) Modified CSI exchange method: As the modified CSI exchange method requires smaller sum overhead than that of CSI exchange method, we derive the upper bound of residual interference in modified CSI exchange method that consists of two types of feedback channel links: i) Feedback of the channel matrix for the initial $v^{[1]}$ and Sequential exchange of the quantized beamformer between transmitter and receiver.

For the initialization of $v^{[1]}$, the K-th receiver transmits the product channel matrix $H_{\text{eff}}^{[K]}$ to the $(K-1)^{th}$ receiver for the computation of $v^{[1]}$ which is designed as the eigenvector of $H_{\text{eff}}^{[K-1]}H_{\text{eff}}^{[K]}$, where $$H_{\text{eff}}^{[K-1]} := \frac{(H^{[K-11]})^{-1}H^{[K-12]}}{\|(H^{[K-11]})^{-1}H^{[K-12]}\|_F} \text{ and } H_{\text{eff}}^{[K]} := \frac{(H^{[K2]})^{-1}H^{[K1]}}{\|(H^{[K2]})^{-1}H^{[K1]}\|_F}$$

Assuming that RVQ is applied and the quantized matrix $$\hat{H}_{\text{eff}}^{[K]}$$

is transmitted through $B_{initial}$ bits feedback channel, the quantized channel matrix is expressed as below equation.

$$\hat{H}_{\text{eff}}^{[K]} = e^{-j\varphi_{initial}}\left(H_{\text{eff}}^{[K]} - \sigma_{initial}\Delta\hat{H}_{\text{eff}}^{[K]}\right) \quad \text{[equation 23]}$$

In equation 23, $$\sigma_{initial}^2 \leq \Gamma(M^2)2^{-\frac{B_{initial}}{M^2-1}}$$

and $$E\left[\|\Delta\hat{H}_{\text{eff}}^{[K]}\|_F^2\right] = 1.$$

Then, K−1-th receiver computes the quantized beamformer $$\hat{v}^{[1]}$$

of $$H_{\text{eff}}^{[K-1]}\hat{H}_{\text{eff}}^{[K]}$$

as below equation.

$$\hat{v}^{[1]} = e^{-j\phi_{initial}}(v^{[1]} - \Delta v^{[1]}) \quad \text{[equation 24]}$$

In equation 24, the quantization error $$\Delta v^{[1]}$$

is expressed by below equation.

$$\Delta v^{[1]} = \sigma_{initial}\sum_{k=1, k \neq m}^{M}\frac{v_k^*H_{\text{eff}}^{[K-1]}\Delta\hat{H}_{\text{eff}}^{[K]}v_m}{\lambda_m - \lambda_k}v_k \quad \text{[equation 25]}$$

In equation 25, $v_m$ and $\lambda_i$ are the m-th eigenvector and eigenvalue of $H_{eff}^{[K-1]}H_{eff}^{[K]}$.

Since the magnitude of quantization error $$\|\Delta v^{[1]}\|^2$$

is represented as below equation, the quantization error of limited feedback is affected by exponential function of $B_{initial}$ and the distribution of eigenvalues $|\lambda_m - \lambda_k|$.

$$\|\Delta v^{[1]}\|^2 \propto \sum_{k=1, k \neq m}^{M} \frac{\sigma_{initial}^2}{|\lambda_m - \lambda_k|^2} \quad \text{[equation 26]}$$

Secondly, the effect of quantization error due to the exchange of beamformers between transmitters and receivers is described. On the assumption of perfect CSI of $H_{eff}^{[K]}$ at receiver K−1, it is considered the limited feedback links from receiver to transmitter, where $B_k$ bits are allocated to quantize $$\hat{v}^{[k]}.$$

From modified CSI exchange method (method 2), receiver K−1 computes $v^{[1]}$ and quantize it to $$\hat{v}^{[1]}$$

with RVQ and feeds back to transmitter 1 through $B_1$ feedback channel. The quantized beamformer $$\hat{v}^{[1]}$$

is represented as below equation.

$$\hat{v}^{[1]} = e^{-j\phi_{K-1}}(v^{[1]} - \sigma_1 \Delta v^{[1]}) \quad \text{[equation 27]}$$

In equation 27, $$\sigma_1^2 = \Gamma(M) 2^{-\frac{B_1}{M-1}}$$

and $$E\left[\|\Delta v^{[1]}\|^2\right] = 1.$$

Following the procedure of method 2, transmitter 1 forwards $$\hat{v}^{[1]}$$

to receiver K. The receiver K designs $$\hat{v}^{[2]}$$

on the subspace of $$H_{eff}^{[K]}\hat{v}^{[1]}$$

as below equation.

$$\begin{aligned}\tilde{v}^{[2]} &= H_{eff}^{[K]} \hat{v}^{[1]} \\ &= e^{-j\varphi_1}(H_{eff}^{[K]} v^{[1]} - \sigma_1 H_{eff}^{[K]} \Delta v^{[1]}) \\ &= e^{-j\varphi_1}(v^{[2]} - \sigma_1 H_{eff}^{[K]} \Delta v^{[1]})\end{aligned} \quad \text{[equation 28]}$$

Then, receiver K quantizes $$\tilde{v}^{[2]}$$

is quantized to $$\hat{v}^{[2]}$$

with $B_2$ bit quantization level and informed to transmitter 2. The quantized precoder $$\hat{v}^{[2]}$$

is represented as below equation.

$$\hat{v}^{[2]} = e^{-j\phi_2}(\tilde{v}^{[2]} - \sigma_2 \Delta v^{[2]}) \quad \text{[equation 29]}$$

In equation 29, $$\sigma_2^2 = \overline{\Gamma}(M) 2^{-M} {}^{B_2}$$

and $$E[\|\Delta v^{[2]}\|^2] = 1.$$

Likewise, the other beamformers $$\tilde{v}^{[3]}, \tilde{v}^{[4]}, \ldots, \text{and } \tilde{v}^{[K]}$$

are designed at receiver 1, 2, . . . , and K−2 and their quantized beamformers $$\hat{v}^{[3]}, \hat{v}^{[4]}, \ldots, \text{and } \hat{v}^{[K]}$$

are fed back to their corresponding transmitters, where $$\hat{v}^{[k]}$$

is modeled as below equation.

$$\hat{v}^{[k]} = e^{-j\phi_k}(\tilde{v}^{[k]} - \sigma_k \Delta v^{[k]}) \quad \text{[equation 30]}$$

In equation 30, $$\sigma_k^2 = 2^{-\frac{B_k}{M-1}}$$

and $$E\left[\|\Delta v^{[k]}\|^2\right] = 1,$$

for $k = 3, 4, \ldots, K$.

Using equation 28, 29 and 30, the sum residual interference affected by quantization error can be analyzed. To analyze the residual interference at each receiver, it is assumed that each receiver designs a zero-forcing receiver with a full knowledge of $$\{\hat{v}^{[k]} : 1 \leq k \leq K\},$$

which cancels M−1 dimensional interferers. Then, the upper-bound of expected sum residual interference is expressed as a function of the feedback bits, the eigenvalue of fading channel and distance between the pairs of transmitter-receiver is suggested as below.

Proposition 3. In modified CSI feedback method, the upper-bound of expected residual interference at each receiver is represented as below equation in given feedback bits $\{B_k\}_{k=1}^{K}$ and channel realization $\{H^{[jk]}\}_{j,k=1}^{K}$.

$$\begin{cases} E[\hat{I}^{[k]}] \leq P d_{kk+2}^{-\alpha} \sigma_{k|2}^2 \lambda_{max}^{[kk+2]}, \text{ for } k = 1, \ldots, K-2 \\ E[\hat{I}^{[K-1]}] \leq P d_{K-11}^{-\alpha}(\sigma_2^2 \lambda_{max}^{[K-12]} + \sigma_1^2 \lambda_{max}^{[K-12]} + \sigma_1^2 \lambda_{max}^{[K-11]}) \\ E[\hat{I}^{[K]}] \leq P d_{K2}^{-\alpha} \sigma_2^2 \lambda_{max}^{[K2]} \end{cases} \quad \text{[equation 31]}$$

2) Star feedback method: In star feedback method, it is assumed that all receivers are connected to CSI-BS with high capacity backhaul links, such as cooperative multicell networks. Then, CSI-BS is allowed to acquire full knowledge of CSI estimated at each receiver. Based on equation 13, CSI-BS computes $v^{[1]}, v^{[2]}, \ldots, v^{[K]}$ and forwards them to the corresponding transmitters. In this section, we consider the $B_k$ feedback bits constraint from CSI-BS to transmitter k and $V_{[k]}$ is quantized as below equation.

$$\hat{v}^{[k]} = e^{-j\phi_k}(v^{[k]} - \sigma_k \Delta v^{[k]})  \quad \text{[equation 32]}$$

In equation 32, $$\sigma_k^2 = \Gamma(M) 2^{-\frac{B_k}{M-1}}$$

and $$E\left[\|\Delta v^{p[k]}\|^2\right] = 1.$$

Given the quantized beamformer, each transmitter sends a data stream that causes the residual interference at the receiver. Following proposition provides the upper-bound of expected residual interference at each receiver that consists of the feedback bits, the eigenvalue of fading channel and distance between the pairs of transmitter-receiver.

Proposition 4. In star feedback method, the upper-bound of expected residual interference at each receiver is represented in given feedback bits $\{B_k\}_{k=1}^{K}$ and channel realization $\{H^{[jk]}\}_{j,k=1}^{K}$ as below equation.

$$\begin{cases} E[\hat{I}^{[k]}] \leq P d_{kk+2}^{-\alpha} \sigma_{k+1}^2 \lambda^{[kk+1]} + P d_{kk+2}^{-\alpha} \alpha_{k+2}^2 \lambda_{max}^{[kk+2]} \\ E[\hat{I}^{[K-1]}] \leq P d_{K-11}^{-\alpha} \sigma_1^2 \lambda_{max}^{[K-11]} + P d_{K-11}^{-\alpha} \sigma_2^2 \lambda_{max}^{[K-2]} \\ E[\hat{I}^{[K]}] \leq P d_{K2}^{-\alpha} \sigma_1^2 \lambda_{max}^{[K]} + P d_{K2}^{-\alpha} \alpha_2^2 \lambda_{max}^{[K2]}. \end{cases} \quad \text{[equation 33]}$$

for $k = 1, \ldots, K-2$.

IV. Dynamic Feedback Bit Allocation Methods for CSI Feedback Methods

The system performance of IA is significantly affected by the number of feedback bits that induces residual interference in a finite rate feedback channel. The dynamic feedback bit allocation strategies that minimize the throughput loss due to the quantization error in given sum feedback bits constraint is explained. Furthermore, It is provided the required number of feedback bits achieving a full network DoF in each CSI feedback methods.

A. Dynamic Bit Allocation for Minimizing Throughput Loss

Consider total $B_{tot}$ bits are given for the feedback framework in the network model. Since the throughput loss is bounded by the expected sum residual interference, we can formulate the dynamic bit allocation problem for minimizing throughput loss as follows equation.

$$\min \sum_{k=1}^{K} E[\hat{I}^{[k]}] \quad \text{[equation 34]}$$

$$\text{s.t.} \sum_{k=1}^{K} B_k \leq B_{tot}$$

Using proposition 3 and proposition 4, equation 34 can be transformed to convex optimization problem with variables $\{B_k\}_{k=1}^{K}$ expressed by below equation.

$$\min \sum_{k=1}^{K} a_k 2^{-\frac{B_k}{M-1}} \quad \text{[equation 35]}$$

$$\text{s.t.} \sum_{k=1}^{K} B_k \leq B_{tot}$$

Here, we define $a_k$ in modified CSI exchange method (method 2) as below equation.

$$a_k = \begin{cases} a_1 = \Gamma(M) \cdot P(d_{K-11}^{-\alpha} \lambda_{max}^{[K-12]} + d_{K-11}^{-\alpha} \lambda_{max}^{[K-11]}) \\ a_2 = \Gamma(M) \cdot P(d_{K2}^{-\alpha} \lambda_{max}^{[K2]} + d_{K-11}^{-\alpha} \lambda_{max}^{[K-12]}) \\ a_k = \Gamma(M) \cdot P d_{k-2k}^{-\alpha} \lambda_{max}^{[k-2k]} \forall k = 3, \ldots, K \end{cases} \quad \text{[equation 36]}$$

And, $a_k$ in star feedback method as below equation.

$$a_k = \begin{cases} a_1 = \Gamma(M) \cdot P(d_{K2}^{-\alpha} \lambda_{max}^{[K1]} + d_{K-11}^{-\alpha} \lambda_{max}^{[K-11]}) \\ a_2 = \Gamma(M) \cdot P(d_{13}^{-\alpha} \lambda_{max}^{[12]} + d_{K2}^{-\alpha} \lambda_{max}^{[K2]}) \\ a_k = \Gamma(M) \cdot P(d_{k-1k+1}^{-\alpha} \lambda_{max}^{[k-1k]} + d_{k-2k}^{-\alpha|} \lambda^{[k-2k]}) \\ a_K = \Gamma(M) \cdot P(d_{K-11}^{-\alpha} \lambda_{max}^{[K-1K]} + d_{K-2K}^{-\alpha} \lambda_{max}^{[K-2]}), \end{cases} \quad \text{[equation 37]}$$

$$k = 3, \ldots, K-1$$

Consider the objective function in equation 35. By forming the lagrangian and taking derivative with respect to $B_k$, it can be expressed by below equation.

$$L = \sum_{k \in U} a_k 2^{-\frac{B_k}{M-1}} + v\left(\sum_{k \in U} B_k - B_{tot}\right) \quad \text{[equation 38]}$$

$$\frac{\partial L}{\partial B_k} = -2^{-\frac{B_k}{M-1}} \ln 2 \frac{a_k}{M-1} + v = 0$$

In equation 38, v is the Lagrange multiplier and U is the set of feedback link $U = \{1, \ldots K\}$. Therefore, we obtain $B_k$ as below equation.

$$B_k = (M-1) \cdot \log_2\left(\frac{\mu a_k}{M-1}\right) \quad \text{[equation 39]}$$

and $B_k$ satisfies the following constraint equation where $$\mu = \frac{\ln 2}{v} \quad \text{[equation 40]}$$

$$\sum_{k \in U} (M-1) \cdot \log_2\left(\frac{\mu a_k}{M-1}\right) = B_{tot}.$$

Combining equation 39 and 40 with $B_k \geq 0$, the number of optimal feedback bit is obtained as below equation.

$$B_k^* = \frac{1}{|U|}\left(\gamma - (M-1) \cdot |U| \cdot \log_2\left(\frac{M-1}{a_k}\right)\right)' \quad \text{[equation 41]}$$

-continued $$\mu = \left(2^{B_{tot}} \prod_{k \in U} \left(\frac{M-1}{a_k}\right)^{M-1}\right)^{\frac{1}{(M-1)\cdot|U|}}$$

In equation 41, $$\gamma = B_{tot} + \sum_{k \in U} (M-1) \cdot \log_2\left(\frac{M-1}{a_k}\right),$$

|U| is the cardinality of U and $$(a)^+ = \begin{cases} a & \text{if } a \geq 0 \\ 0 & \text{if } a < 0. \end{cases}$$

The solution of equation 41 is found iteratively through the waterfilling algorithm, which is described as bellow.

---
Waterfilling algorithm.

i=0; U={1, ..., K};
while i = 0 do
Determine the water-level $$\gamma - B_{tot} + \sum_{k \in U} (M-1) \cdot \log_2\left(\frac{M-1}{a_k}\right)$$

.
Choose the user set $$\bar{k} = \text{argmax}\left\{\frac{M-1}{a_k} : k \in U\right\}$$

.
if $$\gamma - (M-1) \cdot |U| \cdot \log_2\left(\frac{M-1}{a_k}\right) \geq 0$$

then optimal bit allocation
$B_k^*$
in U is determined by equation 43.
i=i+1;
else Let define
U = {U except for $\bar{k}$} and $B_k^* = 0$
.
---

From the waterfilling algorithm, we obtain $\{B_k^*: k \in U\}$. However, $B_k^*$ should become integer so that it is determined the optimal bit allocation $\bar{B}_k^*$ as below equation.

$\bar{B}_k^* = \lfloor B_k^* \rfloor$

In equation 42, $\lfloor x \rfloor$ is the largest integer not greater than x.

B. Scaling Law of Total Feedback Bits

In perfect CSI assumption, each pair of transmitter-receiver link obtains the interference-free link for its desired data stream. However, misaligned beamformers due to the quantization error destroy the linear scaling gain of sum capacity at high SNR regime. In this section, we analyze the total number of feedback bits that achieve a full network DoF K in the proposed CSI feedback methods. The required sum feedback bits are formulated as the function of the channel gains, the number of antennas and SNR that maintain the constant sum rate loss over the whole SNR regimes.

As P goes to infinity, the network DoF in K user interference channel achieves K with constant value of $$\sum_{k=1}^{K} \log_2(\hat{I}^{[k]})$$

according to below equation.

$$DoF = \lim_{P \to \infty} \frac{R_{sum}^{limited}}{\log_2 P} \quad \text{[equation 43]}$$

$$= \lim_{P \to \infty} \frac{\sum_{k=1}^{K} \log_2\left(\frac{P}{d_{kk}^\alpha}|\hat{r}^{[k]} H^{[kk]} \hat{v}^{[k]}|^2\right) - \sum_{i=1}^{K} \log_2(\hat{I}^{[k]})}{\log_2 P}$$

$$= \lim_{P \to \infty} \frac{\sum_{k=1}^{K} \log_2\left(d_{kk}^P |\hat{r}^{[k]} H^{[kk]} \hat{v}^{[k]}|^2\right)}{\log_2 P} -$$

$$\lim_{P \to \infty} \frac{\sum_{k=1}^{K} \log_2(\hat{I}^{[k]})}{\log_2 P}$$

$$= K - \lim_{P \to \infty} \frac{\log_2\left(\prod_{k=1}^{K} \hat{I}^{[k]}\right)}{\log_2 P} - K$$

Therefore, it can be formulated the sum residual interference as an exponential function of $B_k$ as below equation.

$$\sum_{k=1}^{K} \log_2(\hat{I}^{[k]}) = \log_2\left(\prod_{k=1}^{K} \hat{I}^{[k]}\right) \quad \text{[equation 44]}$$

$$= \log_2\left(\prod_{k=1}^{K} a_k 2^{-\frac{B_k}{M-1}}\right)$$

$$= c$$

Equation 44 yields an equation 45.

$$B_{tot}^* = \sum_{k=1}^{K} B_k \quad \text{[equation 45]}$$

$$= (M-1) \cdot \left(\sum_{k}^{K} \log_2 a_k - \log_2 c\right)$$

$$= K \cdot (M-1) \cdot \log_2 P + (M-1) \cdot$$

$$\left(\sum_{k=1}^{K} \log_2 \hat{a}_k - c\right)$$

In equation 45, c is constant and c>0 and
$a_k = P \cdot \hat{a}_k, \forall k$.

Since $B_{tot}^*$ is the integer number, we obtain the required feedback bits $\bar{B}_{tot}^*$ for achieving full DoF as below equation.

$\bar{B}_{tot}^* = \text{nint}(B_{tot}^*)$ [equation 46]

In equation 46, nint(x) is the nearest integer function of x.

C. Implementation of Feedback Bits Controller

As we derived in equation 41 and 45, the computation of $$\{\overline{B}_k^*\}_{k=1}^K$$

and $$\overline{B}_{tot}^*$$

requires the set of channel gain $\{a_k\}_{k=1}^K$ that consist of the path-loss and short-term fading gain from all receivers. Therefore, the optimal bit allocation strategy requires the centralized bit controller that gathers full knowledge of $\{a_k\}_{k=1}^K$ and computes the optimal set of feedback bits. The centralized bit controller can be feasible in star feedback method since it has a CSI-BS connected with all receivers through the backhaul links.

However, the receiver in CSI exchange method only feeds back CSI to corresponding transmitter, implemented by distributed feedforward/feedback channel links. Therefore, the additional bit controller is required to allocate optimal feedback bits in CSI exchange method. Moreover, $\{a_k\}_{k=1}^K$ includes the gain of short-term fading so that CSI of all receivers should be collected to central controller over every transmission period, which requires a large overhead of CSI exchange and causes delay that results in significant interference misalignment in fast channel variation environments.

1) Path-loss based bit allocation method: To reduce the burden of frequent exchange of channel gains for bit allocation, we average $\{a_k\}_{k=1}^K$ over the short-term fading $\{H^{[ij]}\}_{i,j=1}^K$. Consider $$E[\lambda_{max}^{[ij]}] \leq M^2$$

and apply it to equation 36. $E_H[a_k]$ in modified CSI exchange method is represented as below equation where the expected value of ak's consists of transmit power, the number of antennas and path-loss.

$$E_H[a_k] = \begin{cases} E_H[a_1] = \Gamma(M) \cdot 2P \cdot M^2 \cdot d_{K-11}^{-\alpha} \\ E_H[a_2] = \Gamma(M) \cdot PM^2 \cdot (d_{K2}^{-\alpha} + d_{K-11}^{-\alpha}) \\ E_H[a_k] = \Gamma(M) \cdot PM^2 \cdot d_{k-2k}^{-\alpha}, \forall k = 3, \ldots, K. \end{cases}$$ [equation 47]

Applying equation 47 to 41 and 45, the dynamic bit allocation scheme can be implemented by the path-loss exchange between receivers. Since the path-loss shows a long-term variability compared with fast fading channel, the additional overhead for bit allocation is required over the much longer period than the bit allocation scheme in equation 41 and 45.

2) Distributed bit allocation scheme in CSI exchange method: We develop the distributed bit allocation scheme achieving DoF K in modified CSI exchange method, without centralized bit controller. For the distributed bit allocation, we replace the condition (equation 44) that satisfies DoF K as below equation.

$$\log_2(\tilde{I}^{[k]}) = \log_2\left(a_k 2^{-\frac{B_k}{M-1}}\right)$$ [equation 48]

$$= \frac{c}{K}, \forall k = 1, \ldots, K$$

Therefore, the required feedback bit Bk for k-th beamformer is derived as below equation where $a_k$ is represented in equation 36.

$$B_k - (M-1) \cdot \log_2 a_k - (M-1) \cdot \log_2 \frac{c}{K}$$ [equation 49]

Combining equation 49 with 36, each receiver can compute the required feedback bits with its own channel knowledge except for receiver K. Receiver K requires additional knowledge of $$d_{K-11}^{-\alpha} \lambda_{max}^{[K-12]}$$

from receiver K-1 to calculate $a_2$. From equation 49, it is provided the design of modified CSI exchange method with bit allocation of achieving IA in distributed manners as below.

1. step 1; set-up: Receiver K forwards the matrix $(H^{[K2]})^{-1} H^{[K1]}$ to receiver K-1.
2. step 2; computation of $v^{[1]}$: Receiver K-1 computes $v^{[1]}$ as any eigenvector of $(H^{[K-11]})^{-1} H^{[K-12]} (H^{[K2]})^{-1} H^{[K1]}$ and quantizes it to $$\hat{v}^{[1]}$$

with $B_1$ computed by equation 49.

$$\hat{v}^{[1]}$$

is forwarded to transmitter 1. Also, receiver K-1 forwards $$d_{K-11}^{-\alpha} \lambda_{max}^{[K-12]}$$

to receiver K.

3. step 3; computation of v[2]: Transmitter 1 feeds forward $$\hat{v}^{[1]}$$

to receiver K. Then, receiver K calculates $$\hat{v}^{[2]}$$

and quantizes it to $$\hat{v}^{[2]}$$

with $B_2$ computed by equation 49.

$$\hat{v}^{[2]}$$

is fed back to transmitter 2.

4. step 4; computation of $v^{[3]}, \ldots, v^{[K]}$
For i=3: K, Transmitter i-1 forwards $$\hat{v}^{[i-1]}$$

to receiver i-2. Then, receiver i-2 calculates $$\hat{v}^{[i]}$$

and quantizes it to $$\hat{v}^{[i]}$$

with $B_i$ computed by equation 49.

$$\hat{v}^{[i]}$$

is fed back to transmitter i-1.

V. Successive CSI Exchange Method Based on Precoded RS

CSI exchange method in previous description can reduce the amount of network overhead for achieving IA. However, it basically assumes the feedforward/feedback channel links to exchange pre-determined beamforming vectors.

Considering precoded RS in LTE (long term evolution), the CSI exchange method can be slightly modified for the exchange of precoding vector (i.e. beamformer or beamforming vector). However, it still effectively scales down CSI overhead compared with conventional feedback method.

Consider K=M+1 user interference channel, where each transmitter and receiver are equipped with M antennas and DoF(d) for each user is d=1. Based on IA condition and precoding vector in equation 6 and equation 7, we firstly explain the procedure of CSI exchange method in feedforward/feedback framework for K=4. After that, we describe the procedure of CSI exchange method based on precoded RS, in detail.

1. Successive CSI Exchange in Method 1 (e.g. K=4)

In K=4, IA condition is shown as below equation.

$$\text{span}(H^{[13]}V^{[3]}) = \text{span}(H^{[14]}V^{[4]}) \text{ At receiver 1}$$
$$\text{span}(H^{[21]}V^{[1]}) = \text{span}(H^{[24]}V^{[4]}) \text{ At receiver 2}$$
$$\text{span}(H^{[31]}V^{[1]}) = \text{span}(H^{[32]}V^{[2]}) \text{ At receiver 3}$$
$$\text{span}(H^{[42]}V^{[2]}) = \text{span}(H^{[43]}V^{[3]}) \text{ At receiver 4}$$

[equation 50]

$$\rightarrow$$

$$\text{span}(V^{[1]}) = \text{span}((H^{[31]})^{-1} H^{[32]} V^{[2]})$$
$$\text{span}(V^{[2]}) = \text{span}((H^{[42]})^{-1} H^{[43]} V^{[3]})$$
$$\text{span}(V^{[3]}) = \text{span}((H^{[13]})^{-1} H^{[13]} V^{[4]})$$
$$\text{span}(V^{[4]}) = \text{span}((H^{[24]})^{-1} H^{[21]} V^{[1]})$$

Then, precoding vectors at transmitter 1, 2, 3 and 4 can be determined as below equation.

$$V^{[1]} = \text{eigen vector of } (H^{[31]})^{-1} H^{[32]} (H^{[42]})^{-1} H^{[43]} (H^{[13]})^{-1} H^{[14]} (H^{[24]})^{-1} H^{[21]}$$

$$V^{[2]} = (H^{[32]})^{-1} H^{[31]} V^{[1]}$$

$$V^{[3]} = (H^{[43]})^{-1} H^{[42]} V^{[2]}$$

$$V^{[4]} = (H^{[14]})^{-1} H^{[13]} V^{[3]}$$

[equation 51]

In equation 50, the interference from transmitter 3 and 4 are on the same subspace at receiver 1. Likewise, the interference from transmitter 1 and 4, the interference from transmitter 1 and 2, and the interference from transmitter 2 and 3 are on the same subspace at receiver 2, 3, and 4.

To inform the receiver that which interferers are aligned on the same dimension, CSI exchange method firstly requires initial signaling. This initial signaling is transmitted with a longer period than that of precoder update.

After the initial signaling indicated which interferers are aligned at each receiver, the receiver 1, 2, 3, 4 feed back the selected interference channel matrices multiplied by the inverse of another interference channel matrices, $\{(H^{[31]})^{-1} H^{[32]}, (H^{[42]})^{-1} H^{[43]}, (H^{[13]})^{-1} H^{[14]}, (H^{[24]})^{-1} H^{[21]}\}$ to transmitter 1. Based on these product channel matrices, transmitter 1 determines $V^{[1]}$ and forwards it to receiver 3. Then, receiver 3 determines $V^{[2]}$ using the channel information of $(H^{[32]})^{-1} H^{[31]}$, and feeds it back to transmitter 2. With this iterative way, $V^{[3]}$ and $V^{[4]}$ are sequentially determined. This process is already described in previous part. However, it is slightly different in the point that $V^{[1]}$ is determined by transmitter 1 not a receiver 3.

Figure 5:
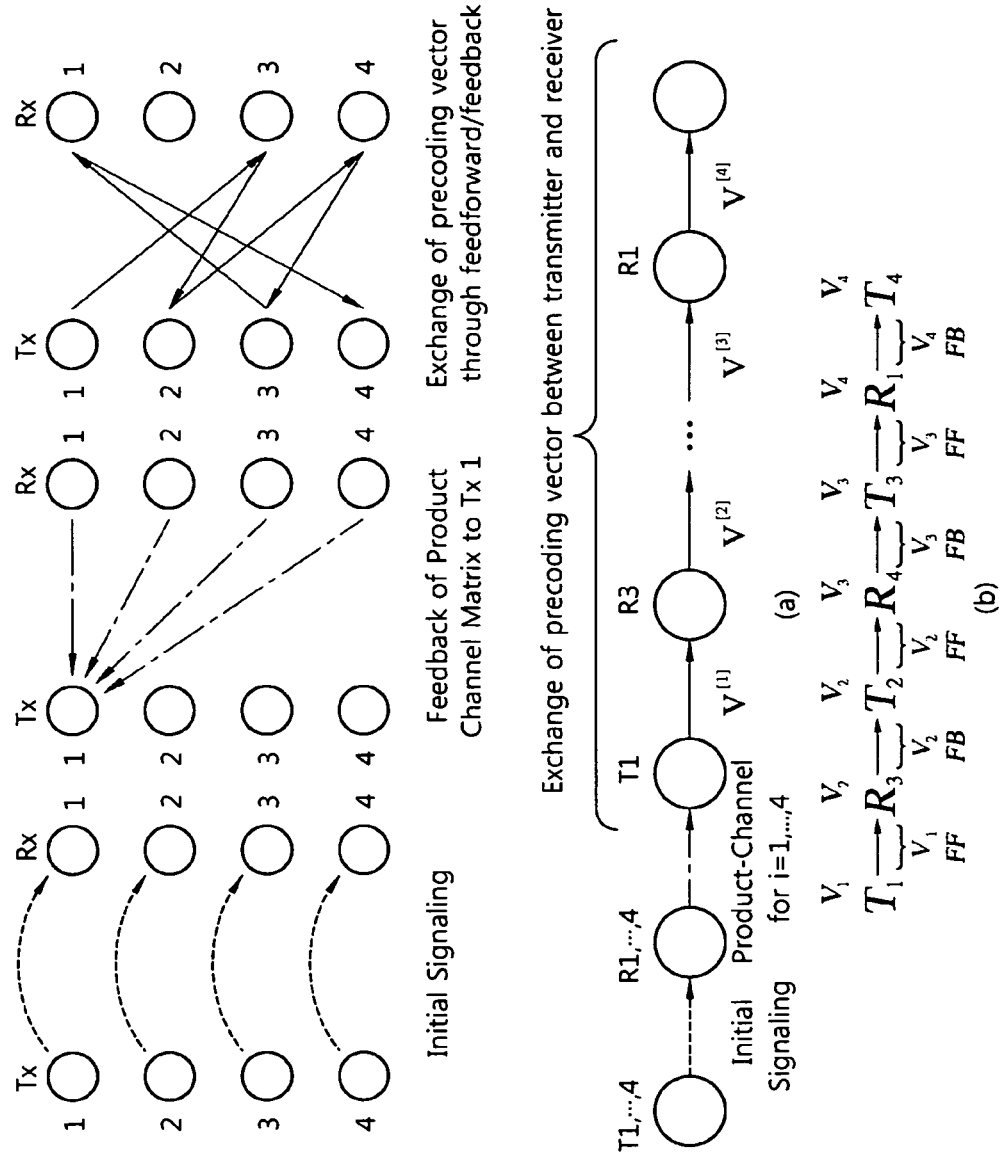
FIG. 5 shows the procedure of CSI exchange method in case that K is 4.

FIG. 5 shows the procedure of CSI exchange method in case that K is 4.

Referring FIG. 5 (a), the procedure of CSI exchange method comprises below steps.

step 1. Initial Signaling: Each transmitter (e.g. BS) reports which interferers are aligned on the same dimension to its receiver. (In K=4, two of four interferers are selected as the aligned interference.)

step 2. Determine initial vector $V^{[1]}$: After initialization, receiver 1, 2, 3, 4 feed back the product channel matrices to transmitter 1, then transmitter 1 can determine VIII.

step 3. Computation of $V^{[2]}$, $V^{[3]}$ and $V^{[4]}$: Transmitter 1 feeds forward $V^{[1]}$ to receiver 3 and receiver 3 calculates $V^{[2]}$. After that, receiver 3 feeds back $V^{[2]}$ to transmitter 2. With the exchange of pre-determined precoding vector, the remained precoding vectors are sequentially computed.

Referring FIG. 5 (b), the step 3 in the CSI exchange method is shown, where FF is feedfoward and FB is feedback links.

In a system using precoded RS such as a LTE system, each transmitter (e.g. BS) transmits the reference symbol with precoding vector. Therefore, the feedfoward signaling in successive CSI exchange can be modified compared with above CSI exchange method.

Figure 6:
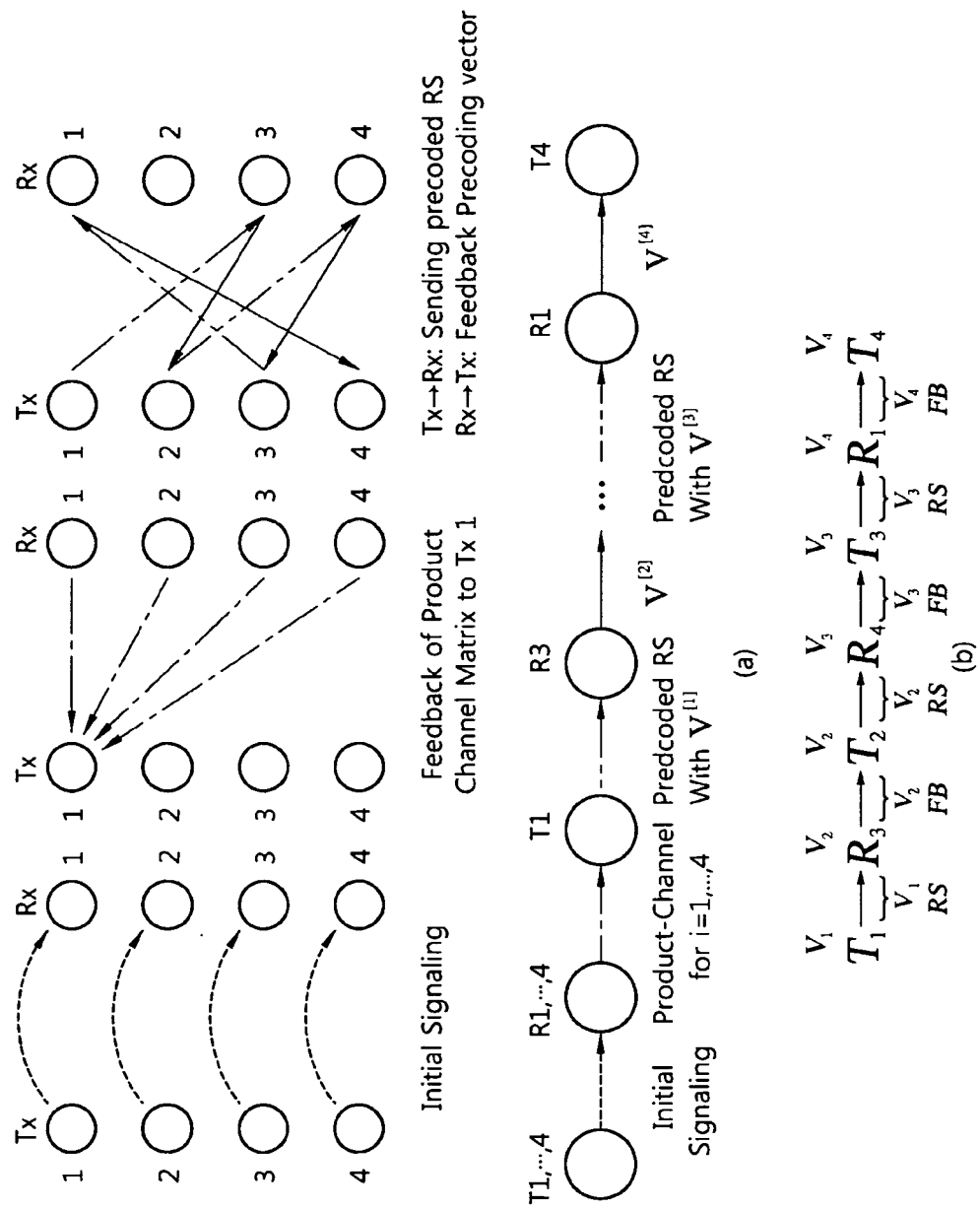
FIG. 6 shows the procedure of CSI exchange method based on precoded RS in case that K is 4.

FIG. 6 shows the procedure of CSI exchange method based on precoded RS in case that K is 4.

Assume that i-th receiver perfectly estimates the channel matrices $\{H^{[1i]}, H^{[2i]}, \ldots, H^{[Ki]}\}$. Then, precoding vectors $V^{[1]}, V^{[2]}, V^{[3]}$, and $V^{[4]}$ for IA are designed by equation 51 in K=4. To compute the precoding vectors, the procedure of CSI exchange method based on precoded RS is suggested as below.

Referring FIG. 6 (a), the procedure of CSI exchange method based on precoded RS comprises below steps.

step 1. Initial signaling: Each BS (transmitter) reports which interferers are aligned on same dimension to its receiver. (The index of aligned interferers is forwarded to the receiver.)

step 2. Determine initial vector $V^{[1]}$: After initialization, receiver 1, 2, 3, 4 feed back the product channel matrices to transmitter 1, then transmitter 1 can determine $V^{[1]}$. Here, the product channel matrices comprises $(H^{[31]})^{-1}H^{[32]}$, $(H^{[42]})^{-1}H^{[43]}$, $(H^{[13]})^{-1}H^{[14]}$ and $(H^{[24]})^{-1}H^{[21]}$.

step 3. computation $V^{[2]}$, $V^{[3]}$ and $V^{[4]}$.

referring FIG. 6(b), the process of the step 3 includes below procedures.

Transmitter 1: After determining its precoder $V^{[1]}$, transmitter 1 sends the precoded RS to receiver 3.

Receiver 3: Receiver 3 estimates effective channel $H_{eff}^{[31]}=H^{[31]}V^{[1]}$. Based on equation 51, receiver 3 computes $V^{[2]}$ multiplying $H_{eff}^{[31]}$ with $(H^{[32]})^{-1}$. Then, receiver 3 sends $V^{[2]}$ to transmitter 2 through feedback channel.

Transmitter 2: Transmitter 2 sends the precoded RS based on $V^{[2]}$ to receiver 4.

Receiver 4: Receiver 4 estimates effective channel $H_{eff}^{[42]}=H^{[42]}V^{[2]}$ and it computes $V^{[3]}$ multiplying $H_{eff}^{[42]}$ with $(H^{[43]})^{-1}$. Then, $V^{[3]}$ is reported to transmitter 3 through feedback channel.

Transmitter 3: Transmitter sends the precoded RS based on $V^{[3]}$ to receiver 1.

Receiver 1: Receiver 1 estimates effective channel $H_{eff}^{[13]}=H^{[13]}V^{[3]}$ and receiver 1 computes $V^{[4]}$ multiplying $H_{eff}^{[13]}$ with $(H^{[14]})^{-1}$. Then, $V^{[4]}$ is reported to transmitter 4 through feedback channel.

VI. Interference Power Control.

Interference misalignment (IM) due to CSI quantization errors results in residual interference at receivers. The interference power at a particular receiver depends on the transmission power at interferers, their beamformers' IM angles, and the realizations of interference channels. Since all links are coupled, there is a need for regulating the transmission power of transmitters such that the number of links meeting their QoS requirements, namely not in outage, is maximized. A suitable approach is for the receivers to send TPC signals to interferers to limit their transmission power. However, designing TPC algorithms based on this approach is challenging due to the dependence of interference power on several factors as mentioned above and the required knowledge of global CSI and QoS requirements.

The TPC signals sent by a receiver provide upper bounds on the transmission power of interferers (i.e. transmitter). First the effect of IM is described and then the method for transmitting a TPC signal for an interference power control is described.

1. The Effect of IM.

The IM due to CSI quantization errors results in residual interference at receivers as explained by the following example.

Consider the 3-user interference channel where the symbol extension (number of subchannels) is $(2n+1)=3$. Given $v^{[2]}=1_{3\times 1}$ and based on IA condition, the $3\times 1$ beamforming vectors $(v_1^{[1]}, v_2^{[1]}, v^{[2]}, v^{[3]})$ satisfy the following constraints in equation 52.

$$H^{[12]}v^{[2]}=H^{[13]}v^{[3]}$$

$$H^{[23]}v^{[3]}=H^{[21]}v_1^{[1]}$$

$$H^{[32]}v^{[2]}=H^{[31]}v_2^{[1]} \qquad \text{[equation 52]}$$

Here, the beamforming vector refers to weights applied to signals transmitted over different subchannels rather than antennas in the case of a multi-antenna system.

Generalizing the above constraints to an arbitrary n and using zero-forcing linear receivers are sufficient to guarantee the optimality in terms of DOF, namely each user achieves the optimal number of DOF equal to ½ per symbol as n converges to infinity. For the current example of $n=1$, the $3\times 1$ zero-forcing beamforming vectors, denoted as $(f_1^{[1]}, f_2^{[1]}, f^{[2]}, f^{[3]})$, satisfy the following constraints equation.

$$f_1^{[1]} \in \text{null}[H^{[11]}v_2^{[1]}, H^{[12]}v^{[2]}]$$

$$f_2^{[1]} \in \text{null}[H^{[11]}v_1^{[1]}, H^{[12]}v^{[2]}]$$

$$f^{[2]} \in \text{null}[H^{[21]}v_1^{[1]}, H^{[21]}v_2^{[1]}]$$

$$f^{[3]} \in \text{null}[H^{[31]}v_1^{[1]}, H^{[32]}v^{[2]}] \qquad \text{[equation 53]}$$

It follows that the receive signals after zero-forcing equalization are interference-free and given as below equation.

$$\hat{x}_1^{[1]}=(f_1^{[1]})^\dagger H^{[11]}v_1^{[1]}x_1^{[1]}+(f_1^{[1]})^\dagger z^{[1]}$$

$$\hat{x}_2^{[1]}=(f_2^{[1]})^\dagger H^{[11]}v_2^{[1]}x_2^{[1]}+(f_2^{[1]})^\dagger z^{[2]}$$

$$\hat{x}^{[2]}=(f^{[2]})^\dagger H^{[22]}v^{[2]}x^{[2]}+(f^{[2]})^\dagger z^{[2]}$$

$$\hat{x}^{[3]}=(f^{[3]})^\dagger H^{[33]}v^{[3]}x^{[3]}+(f^{[3]})^\dagger z^{[3]} \qquad \text{[equation 54]}$$

In equation 54, z are the samples of the AWGN processes. Let $$(\hat{v}_1^{[1]}, \hat{v}_2^{[1]}, \hat{v}^{[3]})$$

denote the quantized version of beamforming vectors $(v_1^{[1]}, v_2^{[1]}, v^{[3]})$. Due to CSI quantization errors, the IA condition in equation 52 are no longer satisfied. This is expressed in equation 55.

$$H^{[12]}v^{[2]} \neq H^{[13]}\hat{v}^{[3]}$$

$$H^{[23]}\hat{v}^{[3]} \neq H^{[21]}\hat{v}_1^{[1]}$$

$$H^{[32]}v^{[2]} \neq H^{[31]}\hat{v}_2^{[1]} \qquad \text{[equation 55]}$$

Consequently, nulling interference using zero-forcing beamforming vector is infeasible since it requires below equation.

$$H^{[12]}v^{[2]}=H^{[13]}\hat{v}^{[3]}$$

$$H^{[23]}\hat{v}^{[3]}=H^{[21]}\hat{v}_1^{[1]}$$

$$H^{[32]}v^{[2]}=H^{[31]}\hat{v}_2^{[1]} \qquad \text{[equation 56]}$$

It follows that the receive signals after zero-forcing equalization are given as below equation.

$$\hat{x}_1^{[1]}=(f_1^{[1]})^\dagger H^{[11]}\hat{v}_1^{[1]}x_1^{[1]}+(f_1^{[1]})^\dagger (H^{[11]}\hat{v}_2^{[1]}x_2^{[1]}+ H^{[12]}\hat{v}^{[2]}x^{[2]}+H^{[13]}\hat{v}^{[3]}x^{[3]})+(f_1^{[1]})^\dagger z^{[1]}$$

$$\hat{x}_2^{[1]}=(f_2^{[1]})^\dagger H^{[11]}\hat{v}_2^{[1]}x_2^{[1]}+(f_1^{[1]})^\dagger (H^{[11]}\hat{v}_1^{[1]}x_1^{[1]}+ H^{[12]}\hat{v}^{[2]}x^{[2]}+H^{[13]}\hat{v}^{[3]}x^{[3]})+(f_2^{[1]})^\dagger z^{[2]}$$

$$\hat{x}^{[2]}=(f^{[2]})^\dagger H^{[22]}\hat{v}^{[2]}x^{[2]}+(f_1^{[2]})^\dagger (H^{[21]}\hat{v}_1^{[1]}x_1^{[1]}+ H^{[21]}\hat{v}_2^{[1]}x_2^{[1]}+H^{[23]}\hat{v}^{[3]}x^{[3]})+(f^{[2]})^\dagger z^{[2]}$$

$$\hat{x}^{[3]}=(f^{[3]})^\dagger H^{[33]}\hat{v}^{[3]}x^{[3]}+(f_1^{[1]})^\dagger (H^{[31]}\hat{v}_1^{[1]}x_1^{[1]}+ H^{[31]}\hat{v}_2^{[1]}x_2^{[1]}+H^{[32]}\hat{v}^{[2]}x^{[2]})+(f^{[3]})^\dagger z^{[3]} \qquad \text{[equation 57]}$$

In equation 57, $$(f_1^{[1]})^\dagger(H^{[11]}\hat{v}_2^{[1]}x_2^{[1]}+H^{[12]}\hat{v}^{[2]}x^{[2]}+H^{[13]}\hat{v}^{[3]}x^{[3]}),$$

$$(f_1^{[1]})^\dagger(H^{[11]}\hat{v}_1^{[1]}x_1^{[1]}+H^{[12]}\hat{v}^{[2]}x^{[2]}+H^{[13]}\hat{v}^{[3]}x^{[3]}),$$

$$(f_1^{[2]})^\dagger(H^{[21]}\hat{v}_1^{[1]}x_1^{[1]}+H^{[21]}\hat{v}_2^{[1]}x_2^{[1]}+H^{[23]}\hat{v}^{[3]}x^{[3]}),$$

$$(f_1^{[1]})^\dagger(H^{[31]}\hat{v}_1^{[1]}x_1^{[1]}+H^{[31]}\hat{v}_2^{[1]}x_2^{[1]}+H^{[32]}\hat{v}^{[2]}x^{[2]}),$$

are residual interferences and z are the samples of the AWGN processes. The residual interferences in the above received signals are nonzero since it is infeasible to choose receiver beamforming vectors in the null spaces of the interference.

2. The Method for Transmitting a TPC Signal for an Interference Power Control.

We propose the method for transmitting a TPC signal between interferers and receivers such that the users' QoS constraints are satisfied. First, to compute the TPC signals, the users' QoS constraints can be translated into constraints on the interference power that are linear functions of the interferers' transmission power as elaborated below.

Figure 7:
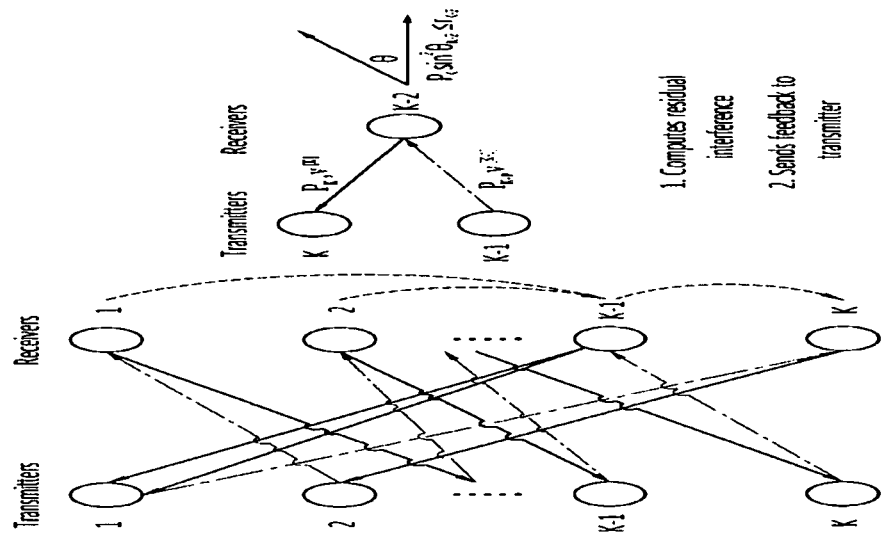
FIG. 7 shows effect of interference misalignment due to quantization of feedback CSI.

FIG. 7 shows effect of interference misalignment due to quantization of feedback CSI.

The quantization errors in feedback CSI causes IM at receivers. Specifically, at each receiver, interference leaks into the data subspace even if linear zero-forcing interference cancellation is applied as illustrated in FIG. 7.

Referring FIG. 7, the length of an arrow for a particular interferer depends on the product of its transmission power and the interference channel. As observed from FIG. 7, the power of each residual interference depends on the transmission power of the corresponding interferer, the misalignment angles of IA beamforming vectors (beamformer), and the interference channel power. Thus, the method for transmitting a TPC signal is to generate TPC signals based on the factors including the misalignment angels of IA beamformers and the interference channel power.

Let the power of the residual interference from the interferer n to the receiver m be denoted by the function $P^{[n]}f(\theta^{[mn]})$ where P represent the transmission power of the transmitter n and $\theta^{[mn]}$ represent the IM angle for the CSI sent from the receiver m to the transmitter n, and $f(\theta^{[mn]}) \leq \sin^2(\theta^{[mn]})$. In this case, the SINR at the receiver m can be written as below equation.

$$\min_{\{\theta^{[k]}\}} \sum_{k=1}^{K} B^{[k]}(\theta^{[k]}) \quad \text{[equation 58]}$$

s.t. constraint in equation 65 ∀ m

In equation 58, $G^{[mn]}$ represents the gain of the data link after transmit and receive beamforming and $\sigma^2$ represents the AWGN noise variance. The QoS requirement for the $m^{th}$ user can be quantified by an outage threshold $\eta^{[m]}$ at the $m^{th}$ receiver where $SINR^{[m]} \geq \eta^{[m]}$ is required for correct data decoding. This leads to a constraint on the interference power expressed in below equation.

$$\min_{\{p[k]\}} \lim_{T \to \infty} \frac{1}{T} \sum_{t=1}^{T} \sum_{k=1}^{K} B^{[k]}(\theta_t^{[k]}) \quad \text{[equation 59]}$$

s.t. constraint in equation 65 ∀ m

The above constraints on the residual interference's power can be used to compute TPC signals sent by the $n^{th}$ receiver for limiting the transmission power $\{P^{[m]}|m \neq n\}$.

Second, the sequential TPC signal exchange between subsets of interferers and interfered receivers is necessary for maximize the number of users who meet their QoS requirements. It is important to note that what matters to a receiver is the sum residual interference power but this receiver needs to control individual interference components by TPC signal. Consequently, a challenge in computing TPC signals is to resolve the dilemma for a receiver that applies too stringent TPC on a particular interferer may cause its data link to be in outage and too loose TPC may cause the interferer to have strong interference on another receiver. Thus TPC exchange provides a decentralized mechanism for receivers to handshake and reach an optimally control of the transmission power of all transmitters. Such TPC signal exchange will exploit the method of CSI exchange methods discussed earlier.

VII. Binary Power Control for Interference Alignment with Limited Feedback

Given finite-rate CSI exchange, quantization errors in CSI cause interference misalignment (IM). To control the resultant interferences, Transmission Power Control (TPC) method is needed. However, the optimal solution for TPC is a non-convex problem.

For the simpler implementation, Binary Power Control (BPC) method is proposed. BPC method has the advantages of simpler power control algorithms. The sum rate capacity performance of BPC method in 2 users, which it is approaching 99% of the capacity of continuous power control. We expand this into general K multi-antenna user and propose a distributed method for implementing binary power control in decentralized networks.

A binary power control (BPC) method is the method that decides the transmit power of transmitter K within $P_K = \{0, P_{max}\}$. That is, a system performed by the BPC method is easily understood as turning on/off system. For the practical use of transmission power control, we propose the BPC method using feedback and feedforward between a transmitter and a receiver.

Consider K=M+1 MIMO user interference channel, where each transmitter and receiver are equipped with M antennas and DoF for each user is d=1. Based on IA condition and precoding vector in equation 50 and 51, we firstly explain error propagation caused by quantization error in CSI exchange method (refer FIG. 2).

1. Error Propagation Caused by Quantization by CSI Exchange Method (K=4, as an Example).

If we assume that any two interferers are designed on the same dimension at each receiver, the resultant precoder (beamforming vector, beamformer) can be expressed in closed-form as below equation.

$V^{[1]}$=eigen vector of $(H^{[31]})^{-1}H^{[32]}(H^{[42]})^{-1}H^{[42]}(H^{[13]})^{-1}H^{[14]}(H^{[24]})^{-1}H^{[21]}$ $V^{[2]} = (H^{[32]})^{-1}H^{[31]}V^{[1]}$ $V^{[3]} = (H^{[43]})^{-1}H^{[42]}V^{[2]}$ $V^{[4]} = (H^{[14]})^{-1}H^{[13]}V^{[3]}$ [equation 60]

In equation 60, each precoder is normalized as $V^{[i]} = V^{[i]}/\|V^{[i]}\|$ for i=1, 2, 3, 4.

The CSI exchange method prevents quantized matrix error by vector form feedback and feedforward. However, while stages of feedback, there inevitably exists an error propagation problem. In K=4, the beamforming vectors (precoding vectors) with quantization error is shown as below equation.

$\hat{V}^{[1]} = V^{[1]} + e^{[1]}$ $\hat{V}^{[2]} = V^{[2]} + e^{[1]} + e^{[2]}$ $\hat{V}^{[3]} = V^{[3]} + e^{[1]} + e^{[2]} + e^{[3]}$ $\hat{V}^{[4]} = V^{[4]} + e^{[1]} + e^{[2]} + e^{[3]} + e^{[4]}$ [equation 61]

In equation 61, $e^{[1]}$ is the channel quantization error from initialization of $V^{[1]}$, $e^{[2]}$ to $e^{[4]}$ is the vector quantization error due to the feedback, and $\hat{V}^{[k]}$ is the beamforming vector with the quantized channel matrices. Due to the error propagation, quantized vector errors are accumulated. Therefore, transmitter 4 causes biggest quantization error and this brings the result of the probability of turning off for each transmitter as FIG. 8.

Figure 8:
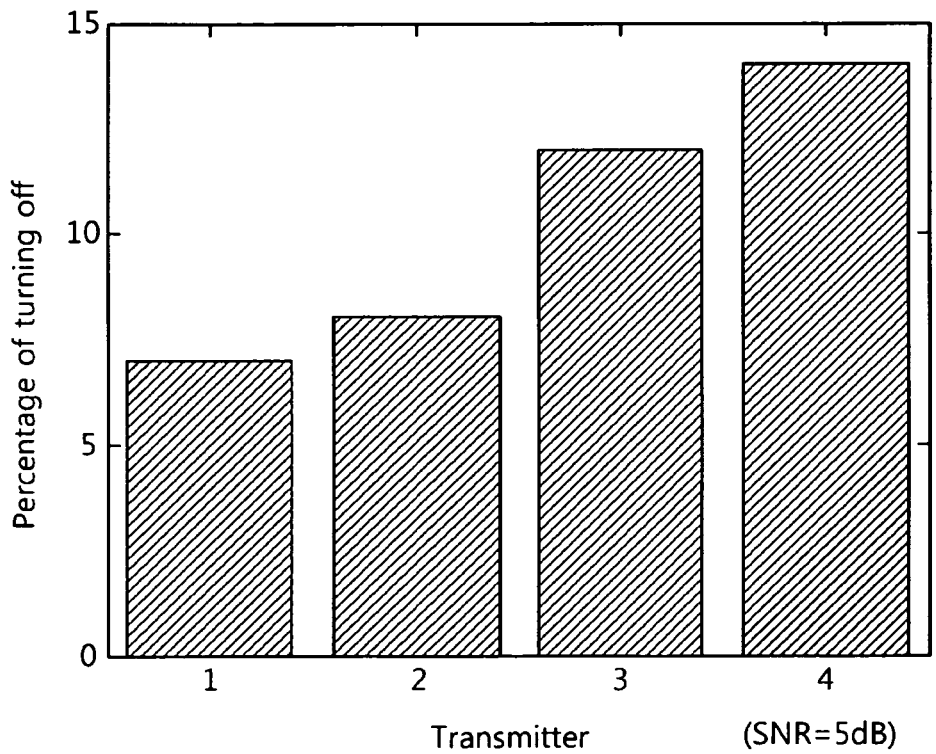
FIG. 8 shows probability of turning off for each transmitter.

FIG. 8 shows probability of turning off for each transmitter.

Referring FIG. 8, probability of turning off is increased as the index of transmitter is increased due to the error propagation.

Using this result, assuming that the receivers has the knowledge of all the interfering channels, the BPC method start decision of the power of user K with the ratio $\gamma_k$ expressed as following equation.

$P_k = 0$ if $\gamma_k < \sigma_k^2$ where $\gamma_k = \sum_{i=1, i \neq k}^{K} P_i U^{[k]\dagger} H^{[ki]} V^{[i]}$ [equation 62]

In equation 62, $U^{[k]}$ is the received M×1 beamforming vector for receiver k, V[i] is the received M×1 beamforming vector for transmitter i, and $H^{[ki]}$ is the M×M channel matrix from transmitter i to receiver k, $\sigma_k^2$ represents the AWGN noise variance.

2. A Binary Power Control (BPC) Method.

Figure 9:
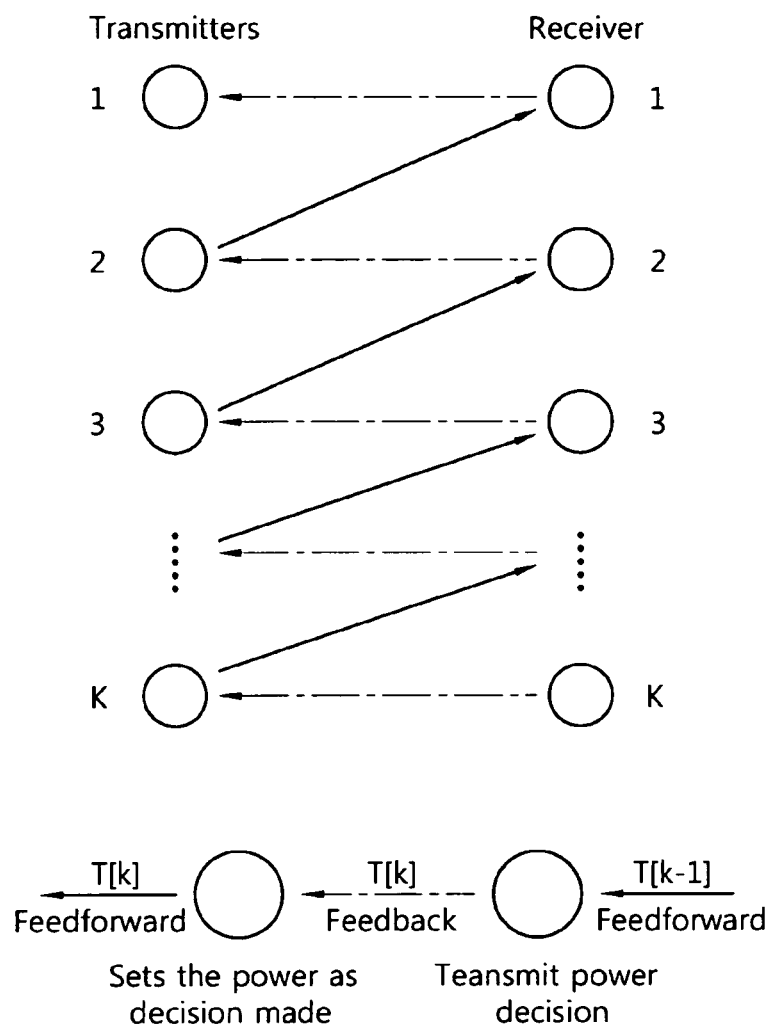
FIG. 9 shows a binary power control method.

FIG. 9 shows a binary power control method.

Referring FIG. 9, the binary power control method comprises following steps.

1. step 1—Transmitter K: Receiver K computes $\gamma_k$ using equation 62 and turns off the link (i.e $P_K = 0$) if $\gamma_K < \sigma_K^2$ and set the power $P_K = P_{Max}$ if $\gamma_K \geq \sigma_K^2$.

Then, the receiver K gives the feedback $T^{[K]}$ to transmitter K. $T^{[K]}$ denotes an indicator bit which indicates on/off. For example, $T^{[k]}=1$ if $P_k=P_{Max}$ and $T^{[k]}=0$ if $P_k=0$. The power for all the other transmitter is set as $P_{Max}$.

2. step 2—Transmitter K-1: Receiver K-1 computes $\gamma_{K-1}$ and turns off the link if $$\gamma_{K-1} < \sigma_{K-1}^2$$

and set the power $P_{K-1}=P_{Max}$ if $$\gamma_{K-1} \geq \sigma_{K-1}^2.$$

Then, the receiver K-1 gives the feedback $T^{[K-1]}$ to transmitter K-1. The power of transmitter K is set in the earlier step (step 1) and $T^{[K]}$ is feedforwarded to receiver K-1. The power for all the other transmitter is considered as $P_{Max}$. This process is repeated until transmitter 2.

3. step 3—Transmitter 1: Receiver 1 computes $\gamma_1$ and decides its power $P_1=\{0, P_{Max}\}$. The power through transmitter 2 to K is set in earlier steps and feedforwarded to receiver 1

The described BPC method is using feedback and feedforward starting from $K^{th}$ user. Due to the error propagation, the $K^{th}$ user has the biggest quantization error. And for this reason, the $K^{th}$ transmitter with the most error happens to transmit with power '0' with the biggest probability. Using this result, this BPC method start decision of the power of $K^{th}$ transmitter for $P_k=\{0, P_{Max}\}$ with the ratio $\gamma_k$ at the $K^{th}$ receiver since the entire receiver has the knowledge of all the interfering channels. This BPC method need not a central unit to determine the network optimal on/off policy and the power of each transmitter is determined as distributed manner.

The solution for continuous power control is a non-convex problem. Therefore, the performance of continuous power control is obtained by exhaustive search. Exhaustive search is a method of generating random samples of combination of transmitters with its power uniformly between 0 and $P_{Max}$ and selects the combination that maximized the sum rate capacity. The performance performed by the continuous power control converges to optimal result when the numbers of generated samples are enough.

To compare the sum rate capacity performance, binary exhaustive search is used. To observe the sum rate capacity performance, first generate all $(2^K-1)$ combinations of transmitters with its power as 0 or $P_{Max}$, and select the combination that maximized the sum rate capacity. In the case of K=4, M=3, the sample of combinations generated are as following. $(P_{Max}, P_{Max}, P_{Max}, P_{Max}), (P_{Max}, P_{Max}, P_{Max}, 0), \ldots, (0, P_{Max}, P_{Max}, P_{Max}), (0,0, P_{Max}, P_{Max}), \ldots, (0, 0, 0, P_{Max})$.

Figure 10:
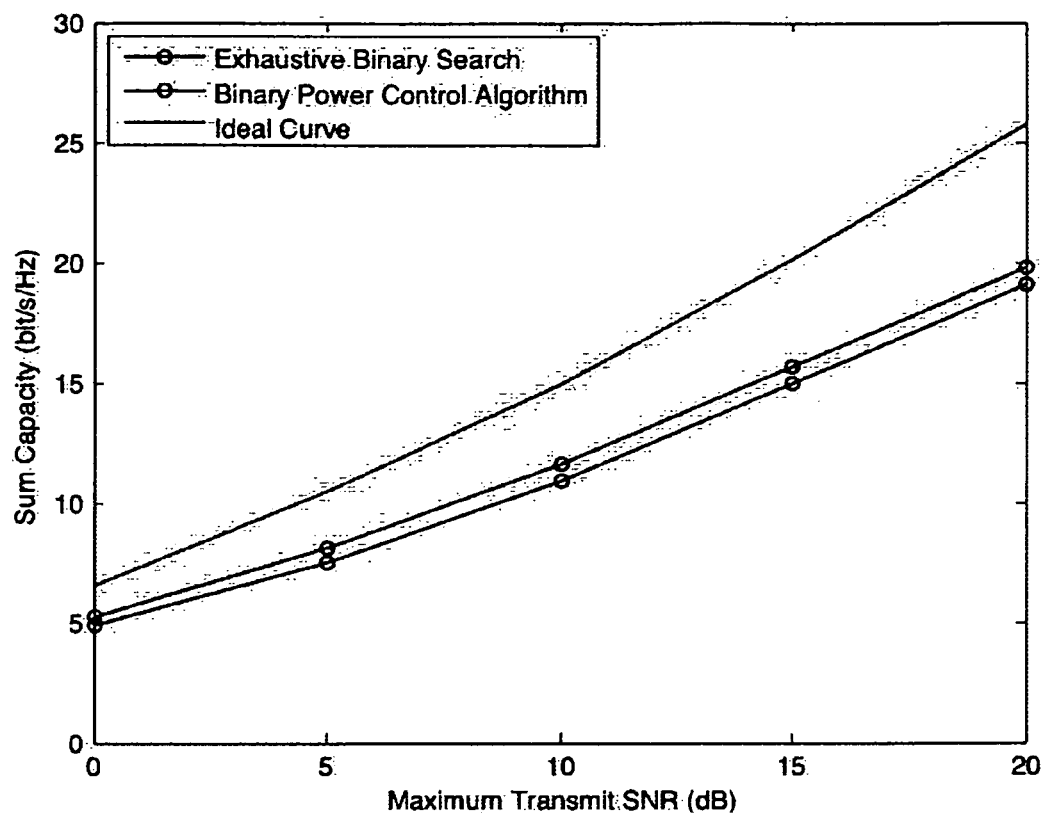
FIG. 10 shows the result of the binary power control method.

FIG. 10 shows the result of the binary power control method.

Referring FIG. 10, When K=4, M=3, feedback bits=6 (using random codebook), the binary power control method approaches to 93% of the capacity of exhaustive search when SNR is 20 dB, which is nearly optimal. The ideal curve is the result in perfect CSI environment.

3. Continuous Power Control Method.

The BPC method described above needs another timeslot for the feedback/feedforward procedure for the power control. Also, the BPC method may incur a situation that too many links are turned off at high SNR environment. To reduce time delay and prevent the situation, continuous power control (CPC) method is proposed.

Figure 11:
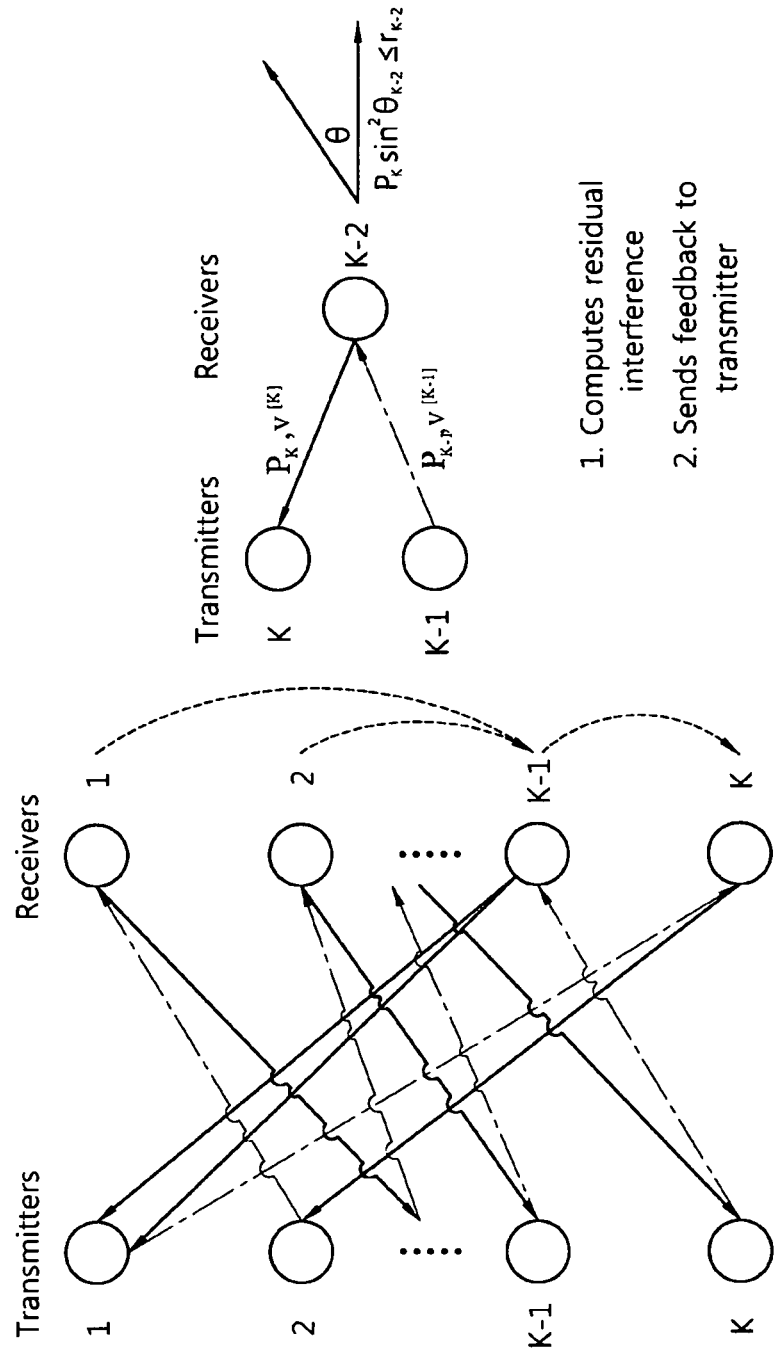
FIG. 11 shows a CPC method.

FIG. 11 shows a CPC method.

Referring FIG. 11, a CPC method comprises below procedures.

1. step 1—Receiver K-1: Receiver K-1 receives all the channel information from other receivers and defines transmitter's beamforming vector $V^{[1]}$ and transmits its quantized vector $$\hat{v}^{[1]}$$

to transmitter 1.

2. step 2—Receiver K: Receiver K receives feedforward of $$\hat{v}^{[1]}$$

from transmitter 1 and defines beamforming vector $V^{[2]}$. Then Receiver K calculates the residual interference with $$\hat{v}^{[1]}$$

and $$\hat{v}^{[2]}$$

which is the quantized vector of $V^{[2]}$. Then, receiver K sets $P_2$, the power of transmitter 2 under the constraint $P_2 \sin^2 \theta_K \leq \Gamma_k \cdot \Gamma_k$ is an interference threshold value of receiver k. The receiver K sends feedback data of $$\hat{v}^{[2]}$$

and $P_2$ to transmitter 2.

3. step 3—Receiver 1: Receiver 1 receives feedforward of $P_2$, $$\hat{v}^{[2]}$$

from transmitter 2 and defines beamforming vector Vu). Then Receiver 1 calculates the residual interference with $$\hat{v}^{[2]}$$

and $$\hat{v}^{[2]}$$

which is the quantized vector of WI. Then, receiver 1 sets $P_3$, the power of transmitter 3 under the constraint $P_3 \sin^2 \theta_1 \leq \Gamma_1$. Then receiver 1 sends feedback data of $$\hat{v}^{[2]}$$

and $P_3$ to transmitter 3. This process (i.e. step 3) is repeated until receiver K-2.

4. step 4—Receiver K-1: After one cycle of feedback/feedforward, Receiver K-1 receives feedforward of PK, $$\hat{v}^{[K]}$$

from transmitter K. And receiver K-1 sets $P_1$, the power of transmitter 1 under the constraint $P_1 \sin^2 \theta_{K-1} \Gamma_{K-1}$. The receiver K-1 sends feedback data of $P_1$ to transmitter 1.

The BPC method described above sends feedback and feedforward of the turning on/off signal ($T^{[K]}$) after setting beamforming vectors, but in the CPC method, the power of each transmitter is set at the receiver along with the decision of the beamforming vectors. The receiver decides the power of each transmitter with the interference threshold $\Gamma_k$, which is predetermined parameter. The receiver k-2 compares the residual interference $P_k \sin^2 \theta_{k-2}$ with the threshold ($\Gamma_{k-2}$) and sets the power of transmitter k.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A power control method for interference alignment in wireless network having K transmitters and K receivers, the method comprising:
   receiving, performed by receiver n (n is an integer, 1≤n≤K−1), a power indication signal of transmitter n+1 from the transmitter n+1;
   determining, performed by the receiver n, power of transmitter n; and
   transmitting, performed by the receiver n, a power indication signal of transmitter n to the transmitter n,
   wherein the power of transmitter n is determined based on a residual interference of the receiver n, and the power indication signal of transmitter n indicates a minimum transmission power or a maximum transmission power of transmitter n.

2. The method of claim 1, further comprising:
   determining, performed by the receiver K, power of transmitter K based on a residual interference of the receiver K; and
   transmitting, performed by the receiver K, a power indication signal of transmitter K to the transmitter K.

3. The method of claim 1, the power indication signal of transmitter n includes 1 bit which indicates the minimum transmission power or the maximum transmission power of transmitter n.

4. The method of claim 1, wherein K is 4 and each of the K transmitters and the K receivers has 3 antennas.

5. The method of claim 1, wherein the residual interference of the receiver n is determined based on the transmission power of transmitter i (i is integer, 1≤i≤K, not n).

6. A power control method for interference alignment in wireless network having K transmitters and K receivers, the method comprising:
   receiving, performed by a receiver n (n is an integer, 1≤n≤K−2), information for transmission power and quantized precoding vector of transmitter n+1 from transmitter n+1;
   determining, performed by the receiver n, a precoding vector of a transmitter n+2;
   calculating, performed by the receiver n, a residual interference based on the quantized preceding vector of transmitter n+1 and a quantized preceding vector of transmitter n+2, and a transmission power of the transmitter n+2; and
   transmitting, performed by the receiver n, the quantized preceding vector of transmitter n+2 and information for the transmission power of the transmitter n+2 to the transmitter n+2.

7. The method of claim 6, further comprising:
   receiving, performed by a receiver K−1, channel information from other receivers;
   determining, performed by the receiver K−1, a quantized precoding vector of a transmitter 1 based on the channel information; and
   transmitting, performed by the receiver K−1, the quantized precoding vector of the transmitter 1 to the transmitter 1.

8. The method of claim 7, further comprising:
   receiving, performed by a receiver K, information for quantized precoding vector of transmitter 1 from transmitter 1;
   determining, performed by the receiver K, a precoding vector of a transmitter 2;
   calculating, performed by the receiver K, a residual interference based on the quantized precoding vector of transmitter 1 and a quantized precoding vector of transmitter 2, and a transmission power of the transmitter 2; and
   transmitting, performed by the receiver K, the quantized precoding vector of transmitter 2 and information for the transmission power of the transmitter 2 to the transmitter 2.

9. The method of claim 6, further comprising:
   receiving, performed by a receiver K−1, information for transmission power and quantized precoding vector of transmitter K from transmitter K;
   determining, performed by the receiver K−1, a transmission power of a transmitter 1; and
   transmitting, performed by the receiver K−1, the transmission power of the transmitter 1 to the transmitter 1.

10. The method of claim 6, wherein K is 4 and each of the K transmitters and the K receivers has 3 antennas.

* * * * *